US010296891B2

(12) United States Patent
Tamari et al.

(10) Patent No.: US 10,296,891 B2
(45) Date of Patent: May 21, 2019

(54) TRANSACTION PROCESSING PLATFORM FOR FACILITATING ELECTRONIC DISTRIBUTION OF PLURAL PREPAID SERVICES

(75) Inventors: Roni Dolev Tamari, San Diego, CA (US); Larry Herbinaux, Vista, CA (US); Darren New, San Diego, CA (US); Miles Paschini, Rancho Sante Fe, CA (US); Patrick K. Hazel, Rancho Sante Fe, CA (US); Marshall Rose, Sacramento, CA (US)

(73) Assignee: Cardpool, Inc., Pleasanton, CA (US)

( * ) Notice: Subject to any disclaimer, the term of this patent is extended or adjusted under 35 U.S.C. 154(b) by 399 days.

(21) Appl. No.: 12/538,083

(22) Filed: Aug. 7, 2009

(65) Prior Publication Data

US 2010/0036743 A1 Feb. 11, 2010

Related U.S. Application Data

(63) Continuation of application No. 12/338,854, filed on Dec. 18, 2008, now abandoned, which is a
(Continued)

(51) Int. Cl.
*H04M 15/00* (2006.01)
*G06Q 20/28* (2012.01)
(Continued)

(52) U.S. Cl.
CPC ............ *G06Q 20/28* (2013.01); *G06Q 20/20* (2013.01); *G06Q 20/202* (2013.01);
(Continued)

(58) Field of Classification Search
CPC ................................ G06Q 20/02; G06Q 20/18
(Continued)

(56) References Cited

U.S. PATENT DOCUMENTS 4,359,631 A 11/1982 Lockwood et al.
4,567,359 A 1/1986 Lockwood
(Continued)

FOREIGN PATENT DOCUMENTS

DE 4017264 A1 12/1991
EP 0863537 A1 9/1998
(Continued)

OTHER PUBLICATIONS

U.S. Appl. No. 12/573,810 Non-Final Rejection dated Dec. 21, 2010.
(Continued)

*Primary Examiner* — Talia F Crawley
(74) *Attorney, Agent, or Firm* — Wick Phillips Gould & Martin LLP; Jerry C. Harris, Jr.

(57) ABSTRACT

A transaction processing platform capable of facilitating the distribution to consumers of various types of prepaid products is disclosed. The transaction processing platform is configured to interface with one or more providers of such prepaid products in order to facilitate the procurement or activation of the products. The platform includes a conduit interface through which service request messages are received and respectively utilized to generate transaction requests for corresponding types of prepaid services. A supply interface arrangement, operatively coupled to the conduit interface, is configured to route a first of the transaction requests through a first supply interface associated with a first type of prepaid service. The supply interface arrangement also routes a second transaction request through a second supply interface associated with a second type of prepaid service. The platform is also configured to provide supplier response information received through the supply interfaces to the conduit interface.

20 Claims, 12 Drawing Sheets

Related U.S. Application Data continuation of application No. 11/851,337, filed on Sep. 6, 2007, now Pat. No. 7,477,731, which is a continuation of application No. 11/007,662, filed on Dec. 7, 2004, now Pat. No. 7,280,644.

(51) Int. Cl.
  *G06Q 20/20* (2012.01)
  *G06Q 30/06* (2012.01)
  *H04M 17/00* (2006.01)
  *G06Q 20/40* (2012.01)

(52) U.S. Cl.
  CPC ..... *G06Q 20/4012* (2013.01); *G06Q 30/0621* (2013.01); *H04M 15/49* (2013.01); *H04M 15/51* (2013.01); *H04M 17/00* (2013.01); *H04M 17/20* (2013.01); *H04M 2017/2593* (2013.01)

(58) Field of Classification Search
  USPC .................................................. 379/114.2
  See application file for complete search history.

(56) References Cited

U.S. PATENT DOCUMENTS

| | | |
|---|---|---|
| RE32,115 E | 4/1986 | Lockwood et al. |
| 4,694,397 A | 9/1987 | Grant et al. |
| 4,951,196 A | 8/1990 | Jackson |
| 5,220,501 A | 6/1993 | Lawlor et al. |
| 5,291,017 A | 3/1994 | Wang et al. |
| 5,309,355 A | 5/1994 | Lockwood |
| 5,350,906 A | 9/1994 | Brody et al. |
| 5,468,958 A | 11/1995 | Franzen et al. |
| 5,477,038 A | 12/1995 | Levine et al. |
| 5,500,514 A | 3/1996 | Veeneman et al. |
| 5,534,683 A | 7/1996 | Rankl et al. |
| 5,557,516 A | 9/1996 | Hogan |
| 5,569,917 A | 10/1996 | Buttrill, Jr. et al. |
| 5,576,951 A | 11/1996 | Lockwood |
| 5,577,100 A | 11/1996 | McGregor et al. |
| 5,577,109 A | 11/1996 | Stimson et al. |
| 5,578,808 A | 11/1996 | Taylor |
| 5,621,787 A | 4/1997 | McKow et al. |
| 5,645,434 A | 7/1997 | Leung |
| 5,650,604 A | 7/1997 | Marcous et al. |
| 5,689,100 A | 11/1997 | Carrithers |
| 5,693,941 A | 12/1997 | Barlow et al. |
| 5,696,908 A | 12/1997 | Muehlberger et al. |
| 5,701,301 A | 12/1997 | Weisser, Jr. |
| 5,714,755 A | 2/1998 | Wells et al. |
| 5,722,067 A | 2/1998 | Fougnies et al. |
| 5,748,737 A | 5/1998 | Daggar et al. |
| 5,763,878 A | 6/1998 | Franzen |
| 5,778,313 A | 7/1998 | Fougnies |
| 5,796,832 A | 8/1998 | Kawan |
| 5,812,773 A | 9/1998 | Norin |
| 5,815,657 A | 9/1998 | Williams et al. |
| 5,826,185 A | 10/1998 | Wise et al. |
| 5,828,740 A | 10/1998 | Khue et al. |
| 5,845,259 A | 12/1998 | West et al. |
| 5,854,975 A | 12/1998 | Fougnies et al. |
| 5,868,236 A | 2/1999 | Rademacher |
| 5,884,292 A | 3/1999 | Baker et al. |
| 5,892,827 A | 4/1999 | Beach et al. |
| 5,897,625 A | 4/1999 | Gustin et al. |
| 5,903,633 A | 5/1999 | Lorsch |
| 5,937,396 A | 5/1999 | Konya |
| 5,915,007 A | 6/1999 | Klapka |
| 5,920,847 A | 7/1999 | Kolling et al. |
| 5,943,424 A | 8/1999 | Berger et al. |
| 5,953,398 A | 9/1999 | Hill |
| 5,969,318 A * | 10/1999 | Mackenthun ........ G06Q 20/341 235/380 |
| 5,945,653 A | 11/1999 | Walker et al. |
| 5,984,180 A | 11/1999 | Albrecht |
| 5,987,438 A | 11/1999 | Nakano et al. |
| 5,991,380 A | 11/1999 | Bruno et al. |
| 5,991,381 A | 11/1999 | Bouanaka et al. |
| 5,991,413 A | 11/1999 | Arditi et al. |
| 5,991,749 A | 11/1999 | Morrill, Jr. |
| 5,991,809 A | 11/1999 | Kriegsman |
| 6,000,608 A | 12/1999 | Dorf |
| 6,012,048 A | 1/2000 | Gustin et al. |
| 6,035,025 A | 3/2000 | Hanson |
| 6,044,360 A | 3/2000 | Picciallo |
| 6,049,774 A | 4/2000 | Romanath |
| 6,058,300 A | 5/2000 | Hanson |
| 6,064,990 A | 5/2000 | Goldsmith |
| 6,081,791 A | 6/2000 | Clark |
| 6,081,840 A | 6/2000 | Zhao |
| 6,157,823 A | 12/2000 | Fougnies et al. |
| 6,169,975 B1 | 1/2001 | White et al. |
| 6,182,138 B1 | 1/2001 | Aoki |
| 6,185,545 B1 | 2/2001 | Resnick et al. |
| 6,188,752 B1 | 2/2001 | Lesley |
| 6,191,699 B1 | 2/2001 | Sawada |
| 6,209,032 B1 | 3/2001 | Dutcher et al. |
| 6,264,104 B1 | 7/2001 | Jenkins et al. |
| 6,269,343 B1 | 7/2001 | Pallakoff |
| 6,289,319 B1 | 9/2001 | Lockwood |
| 6,289,320 B1 | 9/2001 | Drummond et al. |
| 6,294,780 B1 | 9/2001 | Wells et al. |
| 6,299,062 B1 | 10/2001 | Hwang |
| 6,315,195 B1 | 11/2001 | Ramachandran |
| 6,317,754 B1 | 11/2001 | Peng |
| 6,320,947 B1 | 11/2001 | Joyce et al. |
| 6,327,363 B1 | 12/2001 | Henderson et al. |
| 6,330,978 B1 | 12/2001 | Molano et al. |
| 6,386,457 B1 | 5/2002 | Sorie |
| 6,453,162 B1 | 9/2002 | Gentry |
| 6,502,191 B1 * | 12/2002 | Smith ................ G06F 17/3089 707/999.009 |
| 6,510,983 B2 | 1/2003 | Horowitz et al. |
| 6,526,130 B1 * | 2/2003 | Paschini ............ G06Q 20/3552 379/114.19 |
| 6,526,275 B1 | 2/2003 | Calbert |
| 6,574,617 B1 | 6/2003 | Immerman et al. |
| 6,581,827 B2 | 6/2003 | Welton |
| 6,615,189 B1 | 9/2003 | Phillips et al. |
| 6,628,766 B1 | 9/2003 | Hollis et al. |
| 6,651,885 B1 | 11/2003 | Arias |
| 6,742,023 B1 | 5/2004 | Fanning et al. |
| 6,827,260 B2 | 12/2004 | Stoutenburg |
| 6,829,596 B1 | 12/2004 | Frazee |
| 6,842,749 B2 | 1/2005 | Zara et al. |
| 6,910,053 B1 | 6/2005 | Pauly et al. |
| 6,965,667 B2 | 11/2005 | Trabandt et al. |
| 6,973,172 B1 | 12/2005 | Bitove et al. |
| 6,999,943 B1 | 2/2006 | Johnson et al. |
| 7,006,993 B1 | 2/2006 | Cheong et al. |
| 7,031,693 B2 | 4/2006 | Ohrstrom et al. |
| 7,083,084 B2 | 8/2006 | Graves et al. |
| 7,089,209 B1 | 8/2006 | Kolls |
| 7,092,916 B2 | 8/2006 | Diveley |
| 7,103,575 B1 | 9/2006 | Linehan |
| 7,106,843 B1 | 9/2006 | Gainsboro et al. |
| 7,118,030 B2 | 10/2006 | Phillips et al. |
| 7,127,426 B1 | 10/2006 | Coyle |
| 7,131,578 B2 | 11/2006 | Paschini |
| 7,181,416 B2 | 2/2007 | Arias |
| 7,197,662 B2 | 3/2007 | Bullen et al. |
| 7,206,769 B2 | 4/2007 | Laurent et al. |
| 7,209,890 B1 | 4/2007 | Peon et al. |
| 7,210,620 B2 | 5/2007 | Jones |
| 7,210,624 B1 | 5/2007 | Birjandi et al. |
| 7,216,091 B1 | 5/2007 | Blandina et al. |
| 7,248,855 B2 | 7/2007 | Joyce et al. |
| 7,280,644 B2 * | 10/2007 | Tamari ................ G06Q 20/202 379/114.16 |
| 7,280,645 B1 | 10/2007 | Allen et al. |
| 7,325,722 B2 | 2/2008 | Hosnedl et al. |
| 7,333,955 B2 | 2/2008 | Desbiens |
| 7,363,265 B2 | 4/2008 | Horgan |

(56) References Cited

U.S. PATENT DOCUMENTS

| | | |
|---|---|---|
| 7,401,049 B2 | 7/2008 | Hobbs et al. |
| 7,433,212 B2 | 10/2008 | Igarashi et al. |
| 7,440,922 B1 | 10/2008 | Kempkes et al. |
| 7,477,731 B2 * | 1/2009 | Tamari .................. G06Q 20/202 379/114.16 |
| 7,529,563 B1 | 5/2009 | Pitroda |
| 7,562,051 B1 | 7/2009 | Donner |
| 7,574,376 B1 | 8/2009 | Berman et al. |
| 7,578,439 B2 | 8/2009 | Graves et al. |
| 7,580,859 B2 | 8/2009 | Economy et al. |
| 7,580,892 B1 | 8/2009 | Blosser et al. |
| 7,581,674 B2 | 9/2009 | Cohen et al. |
| 7,603,316 B1 | 10/2009 | Fife et al. |
| 7,607,574 B2 | 10/2009 | Kingsborough et al. |
| 7,613,284 B2 | 11/2009 | New |
| 7,614,549 B2 | 11/2009 | Hogg et al. |
| 7,617,152 B2 | 11/2009 | Chai et al. |
| 7,630,926 B2 | 12/2009 | Chakiris et al. |
| 7,647,627 B2 | 1/2010 | Maida-Smith et al. |
| 7,669,758 B2 | 3/2010 | Erikson |
| 7,707,113 B1 | 4/2010 | DiMartino et al. |
| 7,739,162 B1 | 6/2010 | Pettay et al. |
| 7,740,170 B2 | 6/2010 | Singh et al. |
| 7,797,233 B2 | 9/2010 | Sobek |
| 7,822,640 B2 | 10/2010 | Arthur et al. |
| 7,865,432 B2 | 1/2011 | Doran et al. |
| 7,890,422 B1 | 2/2011 | Hirka et al. |
| 7,891,563 B2 | 2/2011 | Oder, II et al. |
| 7,909,242 B2 | 3/2011 | Paschini et al. |
| 7,922,082 B2 | 4/2011 | Muscato |
| 7,925,531 B1 | 4/2011 | Cunningham et al. |
| 7,945,238 B2 | 5/2011 | Baker et al. |
| 7,945,512 B2 | 5/2011 | Scipioni et al. |
| 7,966,496 B2 | 6/2011 | Ellmore |
| 7,991,694 B2 | 8/2011 | Takayama |
| 8,020,754 B2 | 9/2011 | Schwarz, Jr. |
| 8,041,338 B2 | 10/2011 | Chen et al. |
| 8,041,642 B2 | 10/2011 | Lenard et al. |
| 8,060,413 B2 | 11/2011 | Castell et al. |
| 8,090,792 B2 | 1/2012 | Dubnicki et al. |
| 8,095,113 B2 | 1/2012 | Kean et al. |
| 8,135,640 B2 | 3/2012 | Bayne |
| 8,195,565 B2 | 6/2012 | Bishop et al. |
| 8,245,910 B2 | 8/2012 | Sullivan et al. |
| 8,271,343 B2 | 9/2012 | Schorr et al. |
| 8,297,498 B2 | 10/2012 | Vriheas et al. |
| 8,306,912 B2 | 11/2012 | Galit |
| 8,321,270 B2 | 11/2012 | Antonucci |
| 8,341,045 B2 | 12/2012 | Kravitz et al. |
| 8,355,982 B2 | 1/2013 | Hazel et al. |
| 8,359,239 B1 | 1/2013 | Cook et al. |
| 8,371,502 B1 | 2/2013 | Galit et al. |
| 8,458,016 B1 | 6/2013 | Medina, III et al. |
| 8,472,594 B2 | 6/2013 | New et al. |
| 8,479,980 B2 | 7/2013 | Paschini et al. |
| 8,523,054 B2 | 9/2013 | Yankovich et al. |
| 8,626,617 B1 | 1/2014 | Bhatt |
| 8,762,236 B1 | 6/2014 | Shirey et al. |
| 8,768,817 B2 | 7/2014 | Takeo et al. |
| 9,031,880 B2 | 5/2015 | Bishop et al. |
| 2001/0001321 A1 | 5/2001 | Resnick et al. |
| 2001/0021927 A1 | 9/2001 | Laurent et al. |
| 2001/0027446 A1 | 10/2001 | Metcalfe |
| 2001/0037291 A1 | 11/2001 | Allen, II |
| 2001/0039535 A1 | 11/2001 | Tsiounis et al. |
| 2001/0042784 A1 * | 11/2001 | Fite ...................... G06Q 20/202 235/379 |
| 2002/0008198 A1 | 1/2002 | Kasten et al. |
| 2002/0010659 A1 | 1/2002 | Cruse et al. |
| 2002/0046122 A1 | 4/2002 | Barber et al. |
| 2002/0077973 A1 * | 6/2002 | Ronchi .................. G06Q 20/10 705/39 |
| 2002/0099667 A1 * | 7/2002 | Diamandis ............. G06Q 20/02 705/74 |
| 2002/0116280 A1 | 8/2002 | Boies et al. |
| 2002/0128938 A1 | 9/2002 | Schofield et al. |
| 2002/0138358 A1 | 9/2002 | Scheer |
| 2002/0152124 A1 | 10/2002 | Guzman et al. |
| 2002/0152175 A1 | 10/2002 | Armstrong et al. |
| 2002/0156696 A1 | 10/2002 | Teicher |
| 2002/0161650 A1 | 10/2002 | Buchanan et al. |
| 2002/0165820 A1 | 11/2002 | Anvekar |
| 2002/0174034 A1 | 11/2002 | Au et al. |
| 2002/0188510 A1 | 12/2002 | Arias |
| 2003/0014360 A1 | 1/2003 | Arditti et al. |
| 2003/0020947 A1 | 1/2003 | Brewster et al. |
| 2003/0046231 A1 | 3/2003 | Wu |
| 2003/0046249 A1 | 3/2003 | Wu |
| 2003/0050041 A1 | 3/2003 | Wu |
| 2003/0050043 A1 | 3/2003 | Ohrstrom et al. |
| 2003/0177028 A1 | 3/2003 | Cooper et al. |
| 2003/0083946 A1 | 5/2003 | Nishiyama |
| 2003/0095646 A1 | 5/2003 | Paschini |
| 2003/0110104 A1 | 6/2003 | King et al. |
| 2003/0126064 A1 | 7/2003 | Foran |
| 2003/0126075 A1 | 7/2003 | Mascavage, III |
| 2003/0144910 A1 | 7/2003 | Flahery et al. |
| 2003/0145205 A1 | 7/2003 | Sarcanin |
| 2003/0191945 A1 | 10/2003 | Keech |
| 2003/0200179 A1 | 10/2003 | Kwan |
| 2003/0236755 A1 | 12/2003 | Dagelet |
| 2004/0010440 A1 | 1/2004 | Lenard et al. |
| 2004/0011866 A1 | 1/2004 | Saad |
| 2004/0031847 A1 * | 2/2004 | Sorenson ............... G06Q 20/18 235/381 |
| 2004/0049598 A1 | 3/2004 | Tucker et al. |
| 2004/0054603 A1 | 3/2004 | Clinesmith et al. |
| 2004/0066228 A1 | 4/2004 | Lennartson et al. |
| 2004/0077334 A1 | 4/2004 | Joyce et al. |
| 2004/0078332 A1 | 4/2004 | Ferguson et al. |
| 2004/0086098 A1 | 5/2004 | Craft |
| 2004/0088250 A1 | 5/2004 | Bartter et al. |
| 2004/0095604 A1 | 5/2004 | Meyerhofer |
| 2004/0118914 A1 | 6/2004 | Smith et al. |
| 2004/0128508 A1 | 7/2004 | Wheeler et al. |
| 2004/0153410 A1 | 8/2004 | Nootebos et al. |
| 2004/0172367 A1 | 9/2004 | Chavez |
| 2004/0185827 A1 | 9/2004 | Parks |
| 2004/0205023 A1 | 10/2004 | Hafer et al. |
| 2004/0210489 A1 | 10/2004 | Jackson et al. |
| 2004/0215560 A1 | 10/2004 | Amalraj et al. |
| 2004/0218741 A1 | 11/2004 | Welton |
| 2004/0230489 A1 | 11/2004 | Goldthwaite et al. |
| 2004/0254891 A1 | 12/2004 | Blinn et al. |
| 2005/0008132 A1 | 1/2005 | Paschini et al. |
| 2005/0010452 A1 | 1/2005 | Lusen |
| 2005/0027655 A1 | 2/2005 | Sharma et al. |
| 2005/0038714 A1 | 2/2005 | Bonet et al. |
| 2005/0038718 A1 | 2/2005 | Barnes et al. |
| 2005/0114215 A1 | 5/2005 | Tramontano et al. |
| 2005/0123112 A1 | 6/2005 | New et al. |
| 2005/0138127 A1 | 6/2005 | Jain |
| 2005/0192893 A1 | 9/2005 | Keeling et al. |
| 2005/0199706 A1 * | 9/2005 | Beck ..................... G06Q 20/105 235/380 |
| 2005/0229003 A1 | 10/2005 | Paschini et al. |
| 2006/0026073 A1 | 2/2006 | Kenny, Jr. et al. |
| 2006/0043171 A1 | 3/2006 | New et al. |
| 2006/0045244 A1 | 3/2006 | New |
| 2006/0064344 A1 | 3/2006 | Lidow |
| 2006/0074783 A1 | 4/2006 | Agarwal et al. |
| 2006/0074799 A1 | 4/2006 | Averyt et al. |
| 2006/0078100 A1 | 4/2006 | Risafi et al. |
| 2006/0124732 A1 | 6/2006 | Dentlinger |
| 2006/0129419 A1 | 6/2006 | Flaxer et al. |
| 2006/0175394 A1 | 8/2006 | Caven et al. |
| 2006/0184613 A1 * | 8/2006 | Stienessen ........ G06F 17/30902 709/203 |
| 2006/0242087 A1 | 10/2006 | Naehr et al. |
| 2006/0248017 A1 | 11/2006 | Koka et al. |
| 2006/0253335 A1 | 11/2006 | Keena et al. |
| 2007/0023504 A1 | 2/2007 | Blankenship et al. |
| 2007/0073586 A1 | 3/2007 | Dev et al. |
| 2007/0090183 A1 | 4/2007 | Hursta et al. |

(56) References Cited

U.S. PATENT DOCUMENTS

| | | |
|---|---|---|
| 2007/0125838 A1 | 6/2007 | Law et al. |
| 2007/0125840 A1 | 6/2007 | Law et al. |
| 2007/0198437 A1 | 8/2007 | Eisner et al. |
| 2007/0272743 A1 | 11/2007 | Christie et al. |
| 2007/0276765 A1 | 11/2007 | Hazel et al. |
| 2008/0040284 A1 | 2/2008 | Hazel et al. |
| 2008/0059302 A1 | 3/2008 | Fordyce, III et al. |
| 2008/0059379 A1 | 3/2008 | Ramaci et al. |
| 2008/0078831 A1 | 4/2008 | Johnson et al. |
| 2008/0147546 A1 | 6/2008 | Weichselbaumer et al. |
| 2008/0147552 A1 | 6/2008 | Morsillo et al. |
| 2008/0162360 A1 | 7/2008 | Bantz et al. |
| 2008/0177655 A1 | 7/2008 | Zalik |
| 2008/0189214 A1 | 8/2008 | Mueller et al. |
| 2008/0195499 A1 | 8/2008 | Meredith et al. |
| 2008/0208748 A1 | 8/2008 | Ozment et al. |
| 2008/0223920 A9 | 9/2008 | Duke |
| 2008/0255992 A1 | 10/2008 | Lin |
| 2008/0270246 A1 | 10/2008 | Chen |
| 2008/0270253 A1 | 10/2008 | Huang |
| 2008/0319914 A1 | 12/2008 | Carrott |
| 2009/0030836 A1 | 1/2009 | Blandina et al. |
| 2009/0037326 A1 | 2/2009 | Chitti et al. |
| 2009/0037333 A1 | 2/2009 | Flitcroft et al. |
| 2009/0048953 A1 | 2/2009 | Hazel et al. |
| 2009/0048963 A1 | 2/2009 | Bishop et al. |
| 2009/0050688 A1 | 2/2009 | Kon et al. |
| 2009/0106160 A1 | 4/2009 | Skowronek |
| 2009/0234751 A1 | 9/2009 | Chan et al. |
| 2009/0254441 A1 | 10/2009 | Ahlers et al. |
| 2009/0288012 A1 | 11/2009 | Hertel et al. |
| 2009/0299841 A1 | 12/2009 | Bishop et al. |
| 2009/0319348 A1 | 12/2009 | Khosravy et al. |
| 2010/0036743 A1 | 2/2010 | Tamari et al. |
| 2010/0043008 A1 | 2/2010 | Marchand |
| 2010/0094674 A1 | 4/2010 | Marriner et al. |
| 2010/0114731 A1 | 5/2010 | Kingston et al. |
| 2010/0114773 A1 | 5/2010 | Skowronek |
| 2010/0125510 A1 | 5/2010 | Smith et al. |
| 2010/0154027 A1 | 6/2010 | Sobel et al. |
| 2010/0293093 A1 | 11/2010 | Karpenko |
| 2010/0299195 A1 | 11/2010 | Nix et al. |
| 2010/0299221 A1 | 11/2010 | Paschini et al. |
| 2010/0299733 A1 | 11/2010 | Paschini et al. |
| 2011/0035446 A1 | 2/2011 | Goermer et al. |
| 2011/0041006 A1 | 2/2011 | Fowler |
| 2011/0068170 A1 | 3/2011 | Lehman |
| 2011/0099055 A1 | 4/2011 | Khalil |
| 2011/0101093 A1 | 5/2011 | Ehrensvärd |
| 2011/0125645 A1 | 5/2011 | Benkert et al. |
| 2011/0131275 A1 | 6/2011 | Maida-Smith et al. |
| 2011/0161229 A1 | 6/2011 | Mastrangelo et al. |
| 2011/0208656 A1 | 8/2011 | Alba et al. |
| 2011/0218911 A1 | 9/2011 | Spodak |
| 2011/0226620 A1 | 9/2011 | Tadayoni-Rebek et al. |
| 2011/0231272 A1 | 9/2011 | Englund et al. |
| 2011/0307377 A1 | 12/2011 | Nelsen et al. |
| 2012/0150553 A1 | 6/2012 | Wade |
| 2012/0221468 A1 | 8/2012 | Kumnick et al. |
| 2012/0259718 A1 | 10/2012 | Miller et al. |
| 2012/0265681 A1 | 10/2012 | Ross |
| 2012/0317028 A1 | 12/2012 | Ansari |
| 2013/0010941 A1 | 1/2013 | New et al. |
| 2013/0013510 A1 | 1/2013 | Ansari |
| 2013/0018783 A1 | 1/2013 | Ansari |
| 2013/0018793 A1 | 1/2013 | Wong et al. |
| 2013/0030941 A1 | 1/2013 | Meredith et al. |
| 2013/0036019 A1 | 2/2013 | Tamari et al. |
| 2013/0036048 A1 | 2/2013 | Campos et al. |
| 2013/0041768 A1 | 2/2013 | Llach |
| 2013/0054470 A1 | 2/2013 | Campos et al. |
| 2013/0066735 A1 | 3/2013 | Llach |
| 2013/0091060 A1 | 4/2013 | Kundu |
| 2013/0117138 A1 | 5/2013 | Hazel et al. |
| 2013/0185214 A1 | 7/2013 | Azen et al. |
| 2013/0191136 A1 | 7/2013 | Apshago et al. |
| 2013/0262316 A1 | 10/2013 | Hruska |
| 2013/0268437 A1 | 10/2013 | Desai et al. |
| 2013/0304642 A1 | 11/2013 | Campos |
| 2014/0019352 A1 | 1/2014 | Shrivastava |
| 2014/0025519 A1 | 1/2014 | Thomas |
| 2014/0143089 A1 | 5/2014 | Campos et al. |
| 2015/0170128 A1 | 6/2015 | Paschini et al. |

FOREIGN PATENT DOCUMENTS

| | | |
|---|---|---|
| EP | 1286317 A2 | 2/2003 |
| EP | 1829352 A2 | 9/2007 |
| EP | 1829354 A2 | 9/2007 |
| EP | 2521999 A1 | 11/2012 |
| GB | 2215897 A | 9/1989 |
| GB | 2287565 A | 9/1995 |
| JP | 5225221 A | 9/1993 |
| JP | 10174009 | 6/1998 |
| JP | 410155040 | 6/1998 |
| JP | 11259576 | 9/1999 |
| JP | 2003016368 A | 1/2003 |
| KR | 20020020773 A | 3/2002 |
| WO | WO 9641462 | 12/1996 |
| WO | 9746961 A1 | 12/1997 |
| WO | 9847112 | 10/1998 |
| WO | 0111857 | 2/2001 |
| WO | 0116905 A1 | 3/2001 |
| WO | 03071386 | 8/2003 |
| WO | 03083792 A2 | 10/2003 |
| WO | 2004107280 A2 | 12/2004 |
| WO | 2004107280 A3 | 12/2004 |
| WO | 2006062832 A2 | 6/2006 |
| WO | 2006062832 A3 | 6/2006 |
| WO | 2006062842 A2 | 6/2006 |
| WO | 2006062842 A3 | 6/2006 |
| WO | 2007127729 A2 | 11/2007 |
| WO | 2008008671 A2 | 1/2008 |
| WO | 2011085241 A1 | 7/2011 |
| WO | 2011159571 A1 | 12/2011 |
| WO | 2011159579 A2 | 12/2011 |
| WO | 2011159579 A3 | 12/2011 |
| WO | 2012027664 A1 | 3/2012 |
| WO | 2012166790 A1 | 12/2012 |
| WO | 2013123438 A1 | 8/2013 |
| WO | 2014081822 A2 | 5/2014 |
| WO | 2014081822 A3 | 5/2014 |
| WO | 2014107594 A2 | 7/2014 |
| WO | 2014107594 A3 | 7/2014 |

OTHER PUBLICATIONS

EP Application 05825880 European Extended Search Report dated Jun. 8, 2011.
U.S. Appl. No. 10/821,815 Non-Final Rejection dated May 9, 2011.
U.S. Appl. No. 12/786,403 Non-Final Rejection dated May 12, 2011.
U.S. Appl. No. 12/711,211 Non-Final Rejection dated Oct. 1, 2010.
U.S. Appl. No. 10/821,815 Non-Final Rejection dated May 14, 2008.
AFX-Asia, FOCUS, Company News, "Tata Hydro-Electric Q2 to Spet net profit 265.8 min rupees vs 212.4", Oct. 28, 1999, pp. 9-9.
Ameritech Corp., "Ameritech debuts its prepaid cellular," Abstract, RCE Radio Communications Report 15, No. 31 (1996), ref. 7, Ameritech & ATM, PINs, or Prepaid Cards. 1994-1997, Lexis/Nexis Database.
Ameritech Corp., et al., "Ameritech in Prepaid Card Venture," Abstract, American Banker CLX, No. 205 (1995), ref. 9, Ameritech & ATM, PINs, or Prepaid Cards. 1994-1997, Lexis/Nexis Database.
Ameritech Corp., et al., "Phone cards meet ATMs," Abstract, Bank Technology News 8, No. 12 (1995), ref. 8, Ameritech & Atm, PINs, or Prepaid Cards. 1994-1997, Lexis/Nexis Database.
Beach et al., Abstract, U.S. Pat. No. 5,892,827, Apr. 1999, ref. 7, Catalina Marketing—1994-1997. Lexis/Nexis Database.
Business Wire, Inc., FOCUS, Business Editors, "Easy Wireless Unveils Its Revolutionary Pre-Paid PIN Dispensing KIOSK; Wireless 2000", Feb. 28, 2000, p. 3.

(56) References Cited

OTHER PUBLICATIONS

Business Wire, Inc., FOCUS, Business Editors, "The Winner's Edge.com Announces Purchase Agreement", Nov. 1, 1999, pp. 5-6.
"Card Briefs: Sprint is using EDS for phone-card plan," Abstract, American Banker, Section: Credit/Debit/ATMs; p. 19, (1995), ref. 4, EDS (Electronic Data Systems)—1994-1997. Lexis/Nexis Database.
Derfler, "How Networks Work", Bestseller Edition, 1996, Ziff-Davis Press, Emeryville, CA, all pages.
EP Application 05852818 European Extended Search Report dated Jan. 22, 2009.
Gill, Lynn A. et al., In Situ Optimization of the Electrode Geometry of the Quadrupole Ion Trap, International Journal of Mass Spectrometry 188 (1999) p. 87-93.
Gralla, "How the Internet Works", Millennium Edition, 1999, Que Corporation, Indianapolis, IN, all pages.
Innovative Telecom Corporation, Abstract, "Innovative Telecom Corporation Receives Contacts from NYNEX t Provide Prepaid Phone Card Services," PR Newswire, (1995) Section: Financial News, ref. 4, Innovative Telecom—1994-1997. Lexis/Nexis Database.
"Innovative Telecom Corp., and Catalina Marketing Corporation to Make Prepaid Long Distance Certificates Available to 120 Million Shoppers," Abstract, PR Newswire, (1995), Section: Financial News; ref. 4, Catalina Marketing—1994-1997. Lexis/Nexis Database.
Knowles, Francine, "ATMs to Dispense Calling Cards; Ameritech, Cash Station in Venture," Abstract, Financial Section, Chicago Sun-Times, Oct. 18, 1995, ref. 1, Ameritech & ATM, PINs, or Prepaid Cards. 1994-1997. Lexis/Nexis Database.
"Loose Change," Abstract, U.S. Banker (1995), National Edition, Section USB News; Industry, p. 12, ref. 1, EDS (Electronic Data Systems)—1994-1997, Lexis/Nexis Database.
Marcous, et al., Abstract, U.S. Pat. No. 5,650,604, Jul. 1997, Electronic Data Systems Corp., ref. 10, EDS (Electronic Data Systems)—1994-1997. Lexis/Nexis Database.
Mexican Patent Application MX/a/2007/006924 Office Action dated Jul. 28, 2010.
Muller, "Desktop Encyclopedia of the Internet", 1999, Artech House Inc., Norwood, MA, all pages.
"Outsourcing the ATM business," Abstract, Electronic Payments International No. 102 (1995): 6; ref. 5, EDS (Electronic Data Systems)—1994-1997. Lexis/Nexis Database.
PCT/US04/15658 IPRP, ISR and written opinion dated Jun. 22, 2005.
PCT/US05/43756 IPRP, ISR and Written Opinion dated Oct. 3, 2006.
PCT/US05/43705 IPRP, ISR and Written Opinion dated Aug. 10, 2006.
Piskora, Bth, "EDS inroads into ATMs," Abstract, American Banker (1995): 18:1, ref. 8 EDS (Electronic Data Systems) 1994-1997. Lexis/Nexis Database.
Qcomm International, Inc. Website—Oxpress Prepaid Services Pont-of-Sale Activation (2000).
Splendore, Maurizio et al., A New Ion Ejection Method Employing and Asymmetric Trapping Field to Improve the Mass Scanning Performance of an Electrodynamic Ion Trap, International Journal of Mass Spectrometry 190/191 (1999), p. 129-143.
U.S. Appl. No. 10/316,603 Non-Final Rejection dated Sep. 15, 2005.
U.S. Appl. No. 10/316,603 Non-Final Rejection dated Jun. 20, 2006.
U.S. Appl. No. 10/316,603 Non-Final Rejection dated May 21, 2007.
U.S. Appl. No. 10/316,603 Final Rejection dated Aug. 15, 2008.
U.S. Appl. No. 10/316,603 Notice of Allowance dated Dec. 9, 2008.
U.S. Appl. No. 10/821,405 Non-Final Rejection dated Jan. 14, 2009.
U.S. Appl. No. 10/821,405 Final Rejection dated Nov. 23, 2009.
U.S. Appl. No. 10/821,815 Final Rejection dated Feb. 4, 2009.
U.S. Appl. No. 10/821,815 Non-Final Rejection dated Aug. 5, 2009.
U.S. Appl. No. 10/821,815 Non-Final Rejection dated Jun. 19, 2010.
U.S. Appl. No. 10/821,815 Non-Final Rejection dated Aug. 4, 2010.
U.S. Appl. No. 11/007,663 Non-Final Rejection dated Jun. 12, 2008.
U.S. Appl. No. 11/007,663 Ex Party Quale mailed Jul. 16, 2009.
U.S. Appl. No. 11/007,663 Notice of Allowance dated Oct. 30, 2009.
U.S. Appl. No. 10/846,529 Notice of Allowance dated Jul. 27, 2005.
U.S. Appl. No. 10/925,218 Non-Final Rejection dated Oct. 4, 2005.
U.S. Appl. No. 10/925,218 Non-Final Rejection dated Jun. 14, 2006.
U.S. Appl. No. 10/984,363 Non-Final Rejection dated Sep. 22, 2006.
U.S. Appl. No. 10/984,363 Final Rejection dated Apr. 17, 2007.
U.S. Appl. No. 11/552,915 Non-Final Rejection dated May 25, 2010.
U.S. Appl. No. 11/939,327 Non-Final Rejection dated Sep. 19, 2008.
U.S. Appl. No. 11/939,327 Notice of Allowance dated Jun. 19, 2009.
U.S. Appl. No. 11/007,662 Non-Final Rejection dated Jul. 14, 2006.
U.S. Appl. No. 11/007,662 Notice of Allowance dated Jun. 6, 2007.
U.S. Appl. No. 11/851,337 Notice of Allowance dated Sep. 9, 2008.
U.S. West Communications, Abstract, "US West Launches Christmas Prepaid Calling Card With Card Pioneer Innovative Telecom;—Sixty Minute Holiday Card Available Now-," PR Newswire, (1997) Section: Financial News, ref. 1, Innovative Telecom—1994-1997. Lexis/Nexis Database.
VENDAPIN Website—www.vendapin.com/5008.html, "VENDAPIN Model 5004 Four Selection Cellular and IP, Phone Calling Card, Lottery or Admissions Ticket Printer Vending Machine With Optional Two Selection Cellular Phone Dispenser Console", Apr. 3, 2000, pp. 1-4.
White, "How Computers Work", Millennium Edition, 1999, Que Corporation, Indianapolis, IN, all pages.
www.carkleen.co.nz/Products/Codax "Codax Activation System" Car Kleen—Leaders in Vehicle Wash Technology.
Bernkopf, Mark, "Electronic Cash and Monetary Policy," http://ojphi.org/htbin/cgiwrap/bin/ojs/index.php/fm/article/viewFile/465/822, May 6, 1996, pp. 1-6, vol. 1, No. 1, First Monday.
Browne, F. X., et al., "Payments Technologies, Financial Innovation, and Laissez-Faire Banking," The Cato Journal, http://www.cato.org/pubs/journal/cj15n1-6.html, Spring/Summer 1995, 12 pages, vol. 15, No. 1, Cato Institute.
Business Wire entitled "Easy Wireless Unveils Its New Internet Powered Accessory Express Kiosk Station," Feb. 25, 2000, pp. 1-2, West.
Congressional Budget Office Study entitled "Emerging Electronic Methods for Making Retail Payments," Jun. 1996, 63 pages, The Congress of the United States.
Filing receipt and specification for provisional patent application entitled "System for Processing, Activating and Redeeming Value Added Prepaid Cards," by Teri Llach, filed Jan. 8, 2010 as U.S. Appl. No. 61/293,413.
Filing receipt and specification for provisional patent application entitled "Efficient Stored-Value Card Transactions," by Ansar Ansari, filed Jun. 14, 2010 as U.S. Appl. No. 61/354,469.
Filing receipt and specification for provisional patent application entitled "Efficient Stored-Value Card Transactions," by Ansar Ansari, filed Jun. 14, 2010 as U.S. Appl. No. 61/354,470.
Filing receipt and specification for provisional patent application entitled "System and Method for Configuring Risk Tolerance in Transaction Cards," by Arindam Kundu, filed Jun. 14, 2010 as U.S. Appl. No. 61/354,474.
Filing receipt and specification for provisional patent application entitled "System and Method for Configuring Risk Tolerance in Transaction Cards," by Arindam Kundu, filed Jun. 30, 2010 as U.S. Appl. No. 61/360,326.
Filing receipt and specification for provisional patent application entitled "Efficient Stored-Value Card Transactions," by Ansar Ansari, filed Jun. 30, 2010 as U.S. Appl. No. 61/360,327.

(56) References Cited

OTHER PUBLICATIONS

Filing receipt and specification for provisional patent application entitled "Prepaid Card with Savings Feature," by Kellie D. Harper, filed Aug. 27, 2010 as U.S. Appl. No. 61/377,800.
Filing receipt and specification for provisional patent application entitled "System for Payment via Electronic Wallet," by Tomas Ariel Campos, filed May 31, 2011 as U.S. Appl. No. 61/491,791.
Filing receipt and specification for provisional patent application entitled "System for Payment via Electronic Wallet," by Tomas Ariel Campos, filed May 31, 2011 as U.S. Appl. No. 61/491,813.
Filing receipt and specification for provisional patent application entitled "System, Method, and Apparatus for Creating and Distributing a Transaction Credit," by Ansar Ansari, filed Jun. 13, 2011 as U.S. Appl. No. 61/496,397.
Filing receipt and specification for provisional patent application entitled "System, Method, and Apparatus for Creating and Distributing a Transaction Credit," by Ansar Ansari, filed Jun. 13, 2011 as U.S. Appl. No. 61/496,404.
Filing receipt and specification for provisional patent application entitled "Stored-Value Card Transaction Systems and Methods," by Ansar Ansari, filed Aug. 31, 2011 as U.S. Appl. No. 61/529,813.
Filing receipt and specification for provisional patent application entitled "Universal Interactive eGift Registration Button aka The Digital Sticker," by Tomas Ariel Campos, filed Feb. 15, 2012 as U.S. Appl. No. 61/599,249.
Filing receipt and specification for provisional patent application entitled "Universal Interactive eGift Registration Button aka The Digital Sticker," by Tomas Ariel Campos, filed Feb. 22, 2012 as U.S. Appl. No. 61/601,911.
Filing receipt and specification for provisional patent application entitled "eWallet with QR Code," by Tomas Ariel Campos, filed Apr. 4, 2012 as U.S. Appl. No. 61/620,173.
Filing receipt and specification for provisional patent application entitled System for Manging CVV Information in Electronic Wallet, by Tushar Vaish, filed Jan. 3, 2012 as U.S. Appl. No. 61/748,679.
Filing receipt and specification for provisional patent application entitled "System and Method for Providing a Security Code," by Tushar Vaish, et al., filed Mar. 15, 2013 as U.S. Appl. No. 61/799,500.
Filing receipt and specification for provisional patent application entitled "System and Method for Using QR Codes in Conjunction with Electronic Stored-Value Cards," by Tomas Ariel Campos, et al., filed Mar. 15, 2013 as U.S. Appl. No. 61/800,704.
Filing receipt and specification for patent application entitled "Transaction Processing Platform for Facilitating Electronic Distribution of Plural Prepaid Services," by Roni Dolev Tamari, et al., filed Dec. 18, 2008 as U.S. Appl. No. 12/338,854.
Filing receipt and specification for patent application entitled "System and Method for Using Intelligent Codes to Add a Stored-Value Card to an Electronic Wallet," by Tomas Ariel Campos, filed Apr. 4, 2013 as U.S. Appl. No. 13/857,048.
Filing receipt and specification for patent application entitled "System and Method for Electronic Prepaid Account Replenishment," by Miles Paschini, filed Jun. 10, 2013 as U.S. Appl. No. 13/914,360.
Foreign communication from a related counterpart application—Communication, European Application No. 05825880.7, dated Jun. 27, 2011, 1 page.
Foreign communication from a related counterpart application—Communication, European Application No. 05852818.3, dated May 11, 2009, 1 page.
Foreign communication from a related counterpart application—International Preliminary Examination Report, PCT/US2004/015658, dated Mar. 17, 2006, 6 pages.
Foreign communication from a related counterpart application—International Preliminary Report on Patentability, PCT/US2005/043705, dated Jun. 13, 2007, 6 pages.
Foreign communication from a related counterpart application—International Preliminary Report on Patentability, PCT/US2005/043756, dated Jun. 13, 2007, 6 pages.
Foreign communication from a related counterpart application—International Search Report and Written Opinion, PCT/US2011/020570, dated Mar. 7, 2011, 11 pages.
Foreign communication from a related counterpart application—International Preliminary Report on Patentability, PCT/US2011/020570, dated Jul. 10, 2012, 8 pages.
Foreign communication from a related counterpart application—International Search Report and Written Opinion, PCT/US2012/039981, dated Nov. 5, 2012, 35 pages.
Foreign communication from a related counterpart application—Invitation to Pay Additional Fees, PCT/US2012/039981, dated Aug. 28, 2012, 2 pages.
Foreign communication from a related counterpart application—International Search Report and Written Opinion, PCT/US2011/039996, dated Oct. 24, 2011, 8 pages.
Foreign communication from a related counterpart application—International Preliminary Report on Patentability, PCT/US2011/039996, dated Dec. 14, 2012, 7 pages.
Foreign communication from a related counterpart application—International Search Report and Written Opinion, PCT/US2011/040055, dated Jan. 27, 2012, 12 pages.
Foreign communication from a related counterpart application—International Preliminary Report on Patentability, PCT/US2011/040055, dated Dec. 14, 2012, 8 pages.
Foreign communication from a related counterpart application—Invitation to Pay Additional Fees, PCT/US2011/040055, dated Nov. 16, 2011, 2 pages.
Foreign communication from a related counterpart application—International Search Report and Written Opinion, PCT/US2011/049338, dated Jan. 24, 2012, 7 pages.
Foreign communication from a related counterpart application—International Preliminary Report on Patentability, PCT/US2011/049338, dated Mar. 5, 2013, 6 pages.
Foreign communication from a related counterpart application—Invitation to Pay Additional Fees, PCT/US2013/026501, dated Apr. 16, 2013, 2 pages.
Harrop, Peter, "The Electronic Purse," IEE Review, Jun. 1992, pp. 227-231, IEE.
Kreyer, Nina, et al., "Standardized Payment Procedures as Key Enabling Factor for Mobile Commerce," Preceedings of the Third International Conference on E-Commerce and Web Technologies, 2002, pp. 400-409, Springer-Verlag Berlin Heidelberg.
Levy, Steven, "E-Money (That's What I Want)," Wired, 1994, 11 pages, © The Condé Nast Publications Inc., © Wired Digital, Inc.
Lilge, Manfred, "Evolution of Prepaid Service Towards a Real-Time Payment System," 2001, pp. 195-198, IEEE.
Lin, Yi-Bing, et al., "Mobile Prepaid Phone Services," IEEE Personal Communications, Jun. 2000, pp. 6-14, IEEE.
"Model 5008C Eight Selection Card Vending Machine," http://www.vendapin.com/5008.html, downloaded from Internet on May 9, 2013, 1 page.
Advisory Action dated Apr. 12, 2013 (3 pages), U.S. Appl. No. 10/821,815, filed Apr. 9, 2004.
Advisory Action dated Apr. 19, 2012 (3 pages), U.S. Appl. No. 10/821,815, filed Apr. 9, 2004.
Advisory Action dated Apr. 28, 2009 (3 pages), U.S. Appl. No. 10/821,815, filed Apr. 9, 2004.
Office Action (Final) dated Jan. 25, 2013 (15 pages), U.S. Appl. No. 10/821,815, filed Apr. 9, 2004.
Office Action dated Jul. 16, 2012 (15 pages), U.S. Appl. No. 10/821,815, filed Apr. 9, 2004.
Office Action (Final) dated Feb. 1, 2012 (15 pages), U.S. Appl. No. 10/821,815, filed Apr. 9, 2004.
Advisory Action dated Apr. 11, 2013 (3 pages), U.S. Appl. No. 12/786,403, filed May 24, 2010.
Advisory Action dated May 8, 2012 (2 pages), U.S. Appl. No. 12/786,403, filed May 24, 2010.
Office Action (Final) dated Jan. 16, 2013 (15 pages), U.S. Appl. No. 12/786,403, filed May 24, 2010.
Office Action dated Jun. 6, 2012 (14 pages), U.S. Appl. No. 12/786,403, filed May 24, 2010.
Office Action (Final) dated Feb. 14, 2012 (13 pages), U.S. Appl. No. 12/786,403, filed May 24, 2010.

(56) References Cited

OTHER PUBLICATIONS

Advisory Action dated Jan. 8, 2013 (3 pages), U.S. Appl. No. 12/711,211, filed Feb. 23, 2010.
Advisory Action dated Feb. 15, 2012 (3 pages), U.S. Appl. No. 12/711,211, filed Feb. 23, 2010.
Office Action (Final) dated May 22, 2013 (12 pages), U.S. Appl. No. 12/711,211, filed Feb. 23, 2010.
Office Action (Final) dated Oct. 26, 2012 (11 pages), U.S. Appl. No. 12/711,211, filed Feb. 23, 2010.
Office Action dated Apr. 11, 2012 (11 pages), U.S. Appl. No. 12/711,211, filed Feb. 23, 2010.
Office Action (Final) dated Dec. 8, 2011 (12 pages), U.S. Appl. No. 12/711,211, filed Feb. 23, 2010.
Office Action dated Mar. 14, 2013 (9 pages), U.S. Appl. No. 13/619,425, filed Sep. 14, 2012.
Office Action dated Jan. 16, 2013 (6 pages), U.S. Appl. No. 13/619,176, filed Sep. 14, 2012.
Advisory Action dated Jun. 6, 2013 (3 pages), U.S. Appl. No. 13/495,986, filed Jun. 13, 2012.
Office Action (Final) dated Mar. 25, 2013 (13 pages), U.S. Appl. No. 13/495,986, filed Jun. 13, 2012.
Office Action dated Dec. 11, 2012 (15 pages), U.S. Appl. No. 13/495,986, filed Jun. 13, 2012.
Advisory Action dated May 31, 2013 (3 pages), U.S. Appl. No. 13/619,226, filed Sep. 14, 2012.
Office Action (Final) dated Mar. 25, 2013 (13 pages), U.S. Appl. No. 13/619,226, filed Sep. 14, 2012.
Office Action dated Dec. 11, 2012 (15 pages), U.S. Appl. No. 13/619,226, filed Sep. 14, 2012.
Panurach, Patiwat, "Money in Electronic Commerce: Digital Cash, Electronic Fund Transfer, and Ecash," Communications of the ACM, Jun. 1996, pp. 45-50, vol. 39, No. 6, ACM.
Patent Application entitled "Systems and Methods for Distributing Personal Identification Numbers (PINs) Over Computer Networks," by Miles Paschini, filed Apr. 16, 2009 as U.S. Appl. No. 12/425,259.
Patent application entitled "Prepaid Card with Saving Feature," by Kellie D. Harper, filed Feb. 27, 2013 as U.S. Appl. No. 13/819,469.
Provisional patent application entitled "System and Method for Electronic Prepaid Account Replenishment," by Miles Paschini, filed May 28, 2003 as U.S. Appl. No. 60/473,685.
Smart Card Alliance Report PT-03002, "Contactless Payment and the Retail Point of Sale: Applications, Technologies and Transaction Models," Mar. 2003, pp. 1-50.
Ter Maat, Mike, "The economics of e-cash," IEEE Spectrum, Feb. 1997, pp. 68-73, IEEE.
"The future of money: hearing before the Subcommittee on Domestic and International Monetary Policy of the Committee on Banking and Financial Services, House of Representatives, One Hundred Fourth Congress, first session," The Future of Money, Part 4, http://www.archive.org/stream/futureofmoneyhea04unit/futureofmoneyhea04unit_djvu.txt, Jun. 11, 1996, 5 pages.
Visa press release entitled "Visa Unveils Next Generation Electronic Payments and Services," http://corporate.visa.com/newsroom/press-releases/press1124.jsp, May 11, 2011, 3 pages.
Wenninger, John, et al., "The Electronic Purse," Current Issues in Economics and Finance, Apr. 1995, pp. 1-5 plus one information page, vol. 1, No. 1, Federal Reserve Bank of New York.
Cover sheet and specification for provisional patent application entitled "System and Method for Electronic Prepaid Account Replenishment," by Miles Paschini, et al., filed May 28, 2003 as U.S. Appl. No. 60/473,685.
Office Action dated May 9, 2014 (58 pages), U.S. Appl. No. 13/914,360, filed Jun. 10, 2013.
Filing receipt and specification for patent application entitled "System for Payment via Electronic Wallet," by Tomas Ariel Campos, filed Aug. 6, 2014 as U.S. Appl. No. 14/452,829.
Filing receipt and specification for provisional patent application entitled "Endless Endcap," by Tomas Ariel Campos, filed Nov. 20, 2012 as U.S. Appl. No. 61/728,597.
Foreign communication from a related counterpart application—Australian Examination Report, Application No. 2011293250, dated Jun. 2, 2014, 3 pages.
Foreign communication from a related counterpart application—International Search Report and Written Opinion, PCT/US2014/010206, dated Jun. 23, 2014, 10 pages.
Foreign communication from a related counterpart application—International Preliminary Report on Patentability, PCT/US2013/026501, dated Aug. 19, 2014, 12 pages.
Foreign communication from a related counterpart application—International Search Report and Written Opinion, PCT/US2013/070991, dated May 22, 2014, 11 pages.
Notice of Allowance dated Jul. 2, 2014 (41 pages), U.S. Appl. No. 14/065,189, filed Oct. 28, 2013.
Office Action dated Jul. 15, 2014 (19 pages), U.S. Appl. No. 13/619,176, filed Sep. 14, 2012.
Office Action dated Jul. 31, 2014 (38 pages), U.S. Appl. No. 13/621,331, filed Sep. 17, 2012.
Office Action dated Aug. 6, 2014 (30 pages), U.S. Appl. No. 13/704,084, filed Dec. 13, 2012.
Foreign communication from a related counterpart application—Mexican Office Action, Application No. MX/a/2012/007926, dated Nov. 26, 2013, 14 pages.
Foreign communication from a related counterpart application—Mexican Office Action, Application No. MX/a/2012/007926, dated Apr. 25, 2014, 11 pages.
Office Action dated Sep. 26, 2014 (31 pages), U.S. Appl. No. 13/520,849, filed Jul. 6, 2012.
Office Action dated Oct. 1, 2014 (16 pages), U.S. Appl. No. 10/821,815, filed Apr. 9, 2004.
Office Action dated Sep. 9, 2014 (10 pages), U.S. Appl. No. 12/711,211, filed Feb. 23, 2010.
Office Action dated Sep. 15, 2014 (63 pages), U.S. Appl. No. 13/619,226, filed Sep. 14, 2012.
Foreign communication from a related counterpart application—International Search Report and Written Opinion, PCT/US2013/026501, dated Jun. 19, 2013, 15 pages.
Office Action dated Mar. 7, 2014 (15 pages), U.S. Appl. No. 12/786,403, filed May 24, 2010.
Filing receipt and specification for patent application entitled "Systems and Methods for Personal Identification Number Distribution and Delivery," by Darren New, et al., filed Oct. 28, 2013 as U.S. Appl. No. 14/065,189.
Filing receipt and specification for patent application entitled "Transaction Processing Platform for Facilitating Electronic Distribution of Plural Prepaid Services," by Roni Dolev Tamari, et al., filed Dec. 13, 2013 as U.S. Appl. No. 14/106,494.
Foreign communication from a related counterpart application—Examination Report, New Zealand Application No. 605666, dated Aug. 9, 2013, 2 pages.
Foreign communication from a related counterpart application—Examination Report, New Zealand Application No. 607755, dated Dec. 4, 2013, 2 pages.
Office Action dated Oct. 23, 2013 (72 pages), U.S. Appl. No. 13/621,331, filed Sep. 17, 2012.
Office Action dated Jul. 31, 2013 (13 pages), U.S. Appl. No. 13/520,849, filed Jul. 6, 2012.
Office Action (Final) dated Feb. 7, 2014 (51 pages), U.S. Appl. No. 13/619,176, filed Sep. 14, 2012.
Office Action dated Feb. 19, 2014 (9 pages), U.S. Appl. No. 14/065,189, filed Oct. 28, 2013.
Office Action dated Mar. 3, 2014 (69 pages), U.S. Appl. No. 13/704,084, filed Dec. 13, 2012.
Office Action (Final) dated Dec. 6, 2013 (16 pages), U.S. Appl. No. 10/821,815, filed Apr. 9, 2004.
Advisory Action dated Mar. 10, 2014 (3 pages), U.S. Appl. No. 10/821,815, filed Apr. 9, 2004.
Office Action (Final) dated Feb. 20, 2014 (54 pages), U.S. Appl. No. 13/520,849, filed Jul. 6, 2012.
Office Action dated Mar. 10, 2014 (64 pages), U.S. Appl. No. 13/617,751, filed Sep. 14, 2012.
Advisory Action dated Sep. 30, 2013 (4 pages), U.S. Appl. No. 12/711,211, filed Feb. 23, 2010.

(56) References Cited

OTHER PUBLICATIONS

Office Action (Final) dated Mar. 31, 2014 (31 pages), U.S. Appl. No. 13/621,331, filed Sep. 17, 2012.
Examiner's Answer dated Oct. 22, 2013 (12 pages), U.S. Appl. No. 13/495,986, filed Jun. 13, 2012.
Filing receipt and specification for International application entitled "System and Method for Providing a Security Code," filed Jan. 3, 2014 as International application No. PCT/US2014/010206.
Filing receipt and specification for patent application entitled "System and Method for Providing a Security Code," by Tushar Vaish, et al., filed Jan. 3, 2014 as U.S. Appl. No. 14/147,330.
Foreign communication from a related counterpart application—Examination Report, New Zealand Application No. 601208, dated Mar. 5, 2014, 2 pages.
Filing receipt and specification for patent application entitled "System for Processing, Activating and Redeeming Value Added Prepaid Cards," by Teri Llach, et al., filed Mar. 14, 2014 as U.S. Appl. No. 14/213,448.
Filing receipt and specification for provisional patent application entitled "Client Directed Pre-Paid Card," by J. DuWayne Milner, filed Mar. 14, 2013 as U.S. Appl. No. 61/781,667.
Filing receipt and specification for provisional patent application entitled "Systems and Methods for Proxy Card and/or Wallet Redemption Card Transactions," by Tushar Vaish, et al., filed Mar. 11, 2013 as U.S. Appl. No. 61/776,594.
Filing receipt and specification for provisional patent application entitled "Systems and Methods for Proxy Card and/or Wallet Redemption Card Transactions," by Pranav Sheth, et al., filed Mar. 13, 2013 as U.S. Appl. No. 61/779,334.
Filing receipt and specification for patent application entitled "Systems and Methods for Proxy Card and/or Wallet Redemption Card Transactions," by Tomas Ariel Campos, et al., filed Mar. 11, 2014 as U.S. Appl. No. 14/205,065.
Foreign communication from a related counterpart application—Invitation to Pay Additional Fees, PCT/US2014/010206, dated Mar. 27, 2014, 2 pages.
Office Action dated May 19, 2014 (52 pages), U.S. Appl. No. 14/106,494, filed Dec. 13, 2013.
Foreign communication from a related counterpart application—Examination Report, New Zealand Application No. 605666, dated Nov. 3, 2014, 4 pages.
Office Action dated Nov. 19, 2014 (27 pages), U.S. Appl. No. 13/617,751, filed Sep. 14, 2012.
Office Action dated Nov. 13, 2014 (12 pages), U.S. Appl. No. 12/786,403, filed May 24, 2010.
Notice of Allowance dated Oct. 24, 2014 (18 pages), U.S. Appl. No. 13/914,360, filed Jun. 10, 2013.
Office Action dated Dec. 4, 2014 (61 pages), U.S. Appl. No. 14/085,394, filed Nov. 20, 2013.
Office Action dated Dec. 5, 2014 (12 pages), U.S. Appl. No. 14/106,494, filed Dec. 13, 2013.
Foreign communication from a related counterpart application—Examination Report, New Zealand Application No. 605612, dated Nov. 18, 2014, 4 pages.
Foreign communication from a related counterpart application—Examination Report, Australian Application No. 2011268018, dated Nov. 24, 2014, 4 pages.
Foreign communication from a related counterpart application—Examination Report, Australian Application No. 2011268026, dated Nov. 26, 2014, 4 pages.
Foreign communication from a related counterpart application—Australian Examination Report, Application No. 2011203954, dated Nov. 28, 2014, 4 pages.
Foreign communication from a related counterpart application—Search Report, European Application No. 11732229.7, dated Dec. 8, 2014, 8 pages.
Foreign communication from a related counterpart application—Mexican Office Action, Application No. MX/a/2012/007926, dated Nov. 21, 2014, 10 pages.
Office Action dated Mar. 25, 2015 (9 pages), U.S. Appl. No. 12/711,211, filed Feb. 23, 2010.
Office Action dated Jan. 5, 2015 (72 pages), U.S. Appl. No. 14/452,829, filed Aug. 6, 2014.
Office Action (Final) dated Feb. 4, 2015 (16 pages), U.S. Appl. No. 13/619,226, filed Sep. 14, 2012.
Office Action (Final) dated Mar. 18, 2015 (18 pages), U.S. Appl. No. 13/619,176, filed Sep. 14, 2012.
Office Action (Final) dated Mar. 5, 2015 (43 pages), U.S. Appl. No. 13/621,331, filed Sep. 17, 2012.
Office Action dated Mar. 17, 2015 (80 pages), U.S. Appl. No. 13/483,711, filed May 30, 2012.
Advisory Action dated Apr. 3, 2015 (3 pages), U.S. Appl. No. 13/704,084, filed Dec. 13, 2012.
Foreign communication from a related counterpart application—International Preliminary Report on Patentability, PCT/US2012/039981, dated Dec. 2, 2013, 31 pages.
Office Action (Final) dated Jan. 14, 2015 (38 pages), U.S. Appl. No. 13/704,084, filed Dec. 13, 2012.
Office Action (Final) dated Jun. 2, 2015 (33 pages), U.S. Appl. No. 13/520,849, filed Jul. 6, 2012.
Office Action (Final) dated Jun. 3, 2015 (32 pages), U.S. Appl. No. 10/821,815, filed Apr. 9, 2004.
Advisory Action dated May 21, 2015 (6 pages), U.S. Appl. No. 13/621,331, filed Sep. 17, 2012.
Advisory Action dated Apr. 14, 2015 (3 pages), U.S. Appl. No. 13/619,226, filed Sep. 14, 2012.
Office Action (Final) dated May 6, 2015 (13 pages), U.S. Appl. No. 14/106,494, filed Dec. 13, 2013.
Foreign communication from a related counterpart application—Mexican Office Action, Application No. MX/a/2013/013903, Apr. 23, 2015, 9 pages.
Patent application entitled "System and Method of Registering Stored-Value Cards into Electronic Wallets," by Tomas Ariel Campos, et al., filed Aug. 15, 2014 as U.S. Appl. No. 14/379,210.
Office Action (Final) dated Jun. 9, 2015 (26 pages), U.S. Appl. No. 14/085,394, filed Nov. 20, 2013.
Office Action (Final) dated Jun. 18, 2015 (32 pages), U.S. Appl. No. 13/617,751, filed Sep. 14, 2012.
Office Action dated Jun. 29, 2015 (37 pages), U.S. Appl. No. 13/704,084, filed Dec. 13, 2012.
Office Action dated Jul. 15, 2015 (8 pages), U.S. Appl. No. 13/619,176, filed Sep. 14, 2012.
Foreign communication from a related counterpart application—International Preliminary Report on Patentability, PCT/US2014/010206, dated Jul. 7, 2015, 7 pages.
Foreign communication from a related counterpart application—International Preliminary Report on Patentability, PCT/US2013/070991, dated May 26, 2015, 8 pages.
Advisory Action dated Jul. 24, 2015 (13 pages), U.S. Appl. No. 14/106,494, filed Dec. 13, 2013.
Advisory Action dated Aug. 19, 2015 (3 pages), U.S. Appl. No. 14/085,394, filed Nov. 20, 2013.
Office Action dated Jul. 29, 2015 (36 pages), U.S. Appl. No. 14/452,829, filed Aug. 6, 2014.
Office Action dated Oct. 5, 2015 (17 pages), U.S. Appl. No. 13/520,849, filed Jul. 6, 2012.
Office Action dated Oct. 5, 2015 (15 pages), U.S. Appl. No. 13/617,751, filed Sep. 14, 2012.
Advisory Action dated Sep. 23, 2015 (4 pages), U.S. Appl. No. 10/821,815, filed Apr. 9, 2004.
Office Action dated Dec. 31, 2015 (17 pages), U.S. Appl. No. 10/821,815, filed Apr. 9, 2004.
Office Action (Final) dated Sep. 9, 2015 (73 pages), U.S. Appl. No. 12/786,403, filed May 24, 2010.
Advisory Action dated Dec. 16, 2015 (3 pages), U.S. Appl. No. 12/786,403, filed May 24, 2010.
Office Action (Final) dated Oct. 20, 2015 (34 pages), U.S. Appl. No. 12/711,211, filed Feb. 23, 2010.
Office Action dated Sep. 15, 2015 (78 pages), U.S. Appl. No. 14/636,092, filed Mar. 2, 2015.
Office Action (Final) dated Jan. 29, 2016 (21 pages), U.S. Appl. No. 13/619,176, filed Sep. 14, 2012.

(56) References Cited

OTHER PUBLICATIONS

Office Action (Final) dated Jan. 13, 2016 (45 pages), U.S. Appl. No. 13/704,084, filed Dec. 13, 2012.
Office Action dated Sep. 29, 2015 (104 pages), U.S. Appl. No. 13/819,469, filed Jul. 1, 2013.
Office Action dated Oct. 1, 2015 (29 pages), U.S. Appl. No. 13/619,226, filed Sep. 14, 2012.
Office Action dated Nov. 5, 2015 (111 pages), U.S. Appl. No. 13/857,048, filed Apr. 4, 2013.
Office Action dated Nov. 17, 2015 (15 pages), U.S. Appl. No. 14/085,394, filed Nov. 20, 2013.
Office Action dated Feb. 2, 2016 (106 pages), U.S. Appl. No. 14/213,448, filed Mar. 14, 2014.

\* cited by examiner

PIN/POSA DATABASE 134

| | 501 GOOD/SERVICE | 502 PROVIDER | 504 VALUE | 506 PIN | 508 RATE | 510 EXPIRATION | 512 PIN STATUS | 514 USABILITY STATUS |
|---|---|---|---|---|---|---|---|---|
| 512a | Cellular Service | CINGULAR | $15 | 34562345230 | $0.60/min | 1 month | Sold | Active |
| 512b | Cellular Service | CINGULAR | $15 | 2830525950 | $0.60/min | 1 month | Sold | Active |
| 512c | Cellular Service | CINGULAR | $15 | 9823459754 | $0.60/min | 1 month | Available | Active |
| 512d | Cellular Service | CINGULAR | $30 | 4575626584 | $0.50/min | 6 months | Available | Active |
| 512e | Cellular Service | CINGULAR | $30 | 2894754598 | $0.50/min | 6 months | Available | Active |
| | | ... | ... | ... | ... | ... | ... | ... |
| 522a | Cellular Service | AIRTOUCH | $50 | 0948574995 | $0.40/min | 1 year | Sold | Active |
| 522b | Cellular Service | AIRTOUCH | $50 | 9087423543 | $0.40/min | 1 year | Sold | Active |
| 522c | Cellular Service | AIRTOUCH | $50 | 1358909658 | $0.40/min | 1 year | Available | Inactive |
| 522d | Cellular Service | AIRTOUCH | $100 | 8759187405 | $0.35/min | 1 year | Sold | Active |
| 522e | Cellular Service | AIRTOUCH | $100 | 8648767465 | $0.35/min | 1 year | Available | Inactive |
| 522f | Cellular Service | AIRTOUCH | $100 | 3245105748 | $0.35/min | 1 year | Available | Inactive |
| | | ... | ... | ... | ... | ... | ... | ... |
| 512f | Cellular Service | SPRINT | $25 | 8275098427 | $0.55/min | 6 months | Available | Active |
| 512g | Cellular Service | SPRINT | $25 | 0987451455 | $0.55/min | 6 months | Available | Active |
| 512h | Cellular Service | SPRINT | $50 | 1234870987 | $0.39/min | 6 months | Available | Active |
| 512i | Cellular Service | SPRINT | $50 | 8765230058 | $0.39/min | 6 months | Available | Active |
| 512j | Cellular Service | SPRINT | $100 | 4545454892 | $0.36/min | 6 months | Sold | Active |
| 512k | Gasoline | MOBIL | $100 | 1231283950 | Pump Rate | 1 year | Available | Active |
| 512l | Gasoline | MOBIL | $100 | 3458432349 | Pump Rate | 1 year | Available | Active |

FIG. 5

| CARD TYPES TABLE | | |
|---|---|---|
| CARD TYPE ID | PRODUCT TYPE ID | REGION ID |
| ... | ... | ... |

FIG. 8  ⤴ 800

| REGIONS TABLE | |
|---|---|
| REGION ID | CARRIER ID |
| ... | ... |

FIG. 9  ⤴ 900

| CARRIERS TABLE | |
|---|---|
| CARRIER ID | RTS CARRIER ID |
| ... | ... |

FIG. 10  ⤴ 1000

TRANSACTION PROCESSING PLATFORM FOR FACILITATING ELECTRONIC DISTRIBUTION OF PLURAL PREPAID SERVICES

CROSS-REFERENCE TO RELATED APPLICATIONS

This application is a continuation of application of Ser. No. 12/338,854, filed Dec. 18, 2008, entitled "Transaction Processing Platform For Facilitating Electronic Distribution Of Plural Prepaid Services," now abandoned which was a continuation Ser. No. 11/851,337, filed Sep. 6, 2007, entitled "Transaction Processing Platform For Facilitating Electronic Distribution Of Plural Prepaid Services," now U.S. Pat. No. 7,477,731 which was a continuation of Ser. No. 11/007,662, filed Dec. 7, 2004, entitled "Transaction Processing Platform For Facilitating Electronic Distribution Of Plural Prepaid Services," now U.S. Pat. No. 7,280,644 which is related to application Ser. No. 10/316,603, entitled "System And Method For Distributing Personal Identification Numbers Over A Computer Network", which is a continuation of application Ser. No. 09/619,392, now U.S. Pat. No. 6,526,130. This application is also related to application Ser. No. 10/925,218, entitled "Method and Apparatus for Receipt Printing and Information Display in a Personal Identification Number Delivery System." The content of each of these applications is hereby incorporated by reference herein in its entirety for all purposes.

FIELD OF THE INVENTION

The present invention relates generally to methods and apparatus for effecting payment for goods and services. More particularly, but not exclusively, the present invention is directed to systems and methods for facilitating the electronic activation and distribution of plural prepaid services following receipt of payment at a point-of-sale or other convenient location.

BACKGROUND

There currently exist "pre-paid" telephone cards that allow a customer to purchase a desired amount of long-distance telephone time from a particular telephone service provider. These pre-paid telephone cards are often sold by dealers such as convenience stores or wireless phone stores. Pre-paid telephone cards are also often sold in airports. Vending machines for selling pre-paid telephone cards also have been developed. Each of these pre-paid telephone cards has a specific monetary denomination. For example, a customer could purchase a $10 card, a $20 card, or a $100 card. These pre-paid telephone cards are sold by particular telephone service providers such as AT&T, MCI, Sprint, etc. A customer could, for example, buy a $20 MCI card, which would entitle him or her to $20 worth of long-distance calling service provided by MCI. These cards are referred to as "pre-paid" because the customer purchases the long-distance time before he or she actually places the call. This is in contrast to the more typical post-pay service that most telephone customers use with the telephone in their residence or office. With post-pay service, customers are sent a bill on a periodic basis. The customer pays for calls that have already been made, rather than calls that will be made in the future.

Frequently, the pre-paid telephone cards that are sold by dealers or vending machines are of the "scratch-off" type. After the customer purchases a card, he or she can scratch off a layer of material which reveals a personal identification number (PIN). The layer of scratch-off material hides the PIN from customers browsing in the store who have not purchased the card. After a customer purchases a card and scratches off the layer of material, the customer can then use the card to place a long-distance call. When the customer wishes to place a long-distance call, he or she dials a special number provided by the telephone service provider. The customer then enters the PIN written on the card. The long distance provider automatically debits the charge of the call from an account associated with the PIN.

As an example, a customer could purchase a $10 MCI card. After the customer rubs off the layer of material, a PIN number 129384348764 is revealed. When the customer wishes to place a long-distance call, the customer dials an MCI access number. The customer then enters PIN 129384348764. The long-distance carrier, MCI, identifies the PIN and recognizes that there is $10 worth of credit in this account. If the customer places a call which lasts 5 minutes and costs 4$, MCI will debit the account so that $6 remains. The next time the customer places a call using that PIN number, the system will find that $6 remains in the account associated with that PIN.

One problem with these pre-paid phone cards is that the cards present a major inventory headache for dealers. There is a lot of work and expense associated with maintaining a filled inventory of cards. First, the dealer or vending machine operator has to predict which cards will be in demand and determine how many cards of each denomination to order for each of various providers. The dealer then has to pay for the desired inventory of cards up front, which requires a significant cash outlay. The dealer then has to keep track of how many cards are left in stock for each service provider and of each different monetary denomination, and determine when to order a new batch of cards. All of these costs associated with filled inventory can be time consuming and expensive for dealers.

Another problem is that these pre-paid telephone cards are especially vulnerable to theft, loss, and other inventory "shrinkage." Because the cards are small, it is easy for a shoplifter to pocket a card unnoticed. Since these cards have a high value to them and are so easy to pocket, dealers which sell these cards are extremely vulnerable to inventory shrinkage.

Vending card machines have been proposed which store personal identification numbers (PINs) in a memory in the machine. A customer can then purchase a pre-paid telephone PIN by inserting cash into the machine. Once the cash has been inserted, a PIN and usage instructions stored within the machine memory are printed upon a blank card that is dispensed to the customer. The machine can replenish its stock of PINs when the memory runs out of PINs or on a periodic basis by accessing a remote store of PINs via a modem.

The problem with these vending machines is that there are still significant costs associated with inventorying the PINs. The PINs are retained in a memory in the machine which has a similar effect to storing cards. Once a PIN has been stored in the memory of a particular machine, that PIN becomes unavailable to be used by any other dealer, even if the PIN is never purchased. Additionally, if the machine were to break, or the memory were to be erased, there is a problem determining who is responsible for paying for the PINs that were contained in the memory. Additionally, decisions must still be made how many PINs to store in memory, what monetary denominations to store in memory, and for which providers to store PINs in memory. Therefore, there are still significant inventory costs associated with storing the PINs in the vending machine. Additionally, these proposed vending machines do not provide consumers the ability to obtain a PIN from the convenience of their homes or offices.

A system addressing the shortcomings of these prepaid vending approaches is described in U.S. Pat. No. 6,526,130 (the "'130 patent"), which is assigned to the assignee of the present invention. The '130 patent describes a secure system capable of providing PINs for pre-paid goods and services conveniently to customers. The system of the '130 patent advantageously relieves dealers such as convenience stores and vending machine operators from the costs associated with maintaining a filled inventory of pre-paid cards and PINs. In addition, the system allows consumers to select from a wide-range of providers and monetary denominations without requiring the dealer to maintain a large filled inventory of cards or predict which type of cards or PINs to order. Specifically, after a customer purchases a pre-paid amount of a good or service, the customer receives a personal identification number (PIN) capable of being downloaded in real-time over a network such as the Internet. After the customer receives the PIN, the customer can then use this PIN at any convenient time to access the desired good or service. The system of the '130 patent also advantageously enables dealers from having to enter into separate business relationships with each prepaid service provider for which the dealer sells PINs. Similarly, the '130 system obviates the necessity for prepaid service providers to separately contract with each dealer distributing PINs on their behalf. However, an operator of the system of the '130 will typically be required to pay the various prepaid service providers for the PIN-based inventory maintained within the PIN repository of the '130 system, because such inventory needs to be available prior to being requested by a retailer.

In an effort to avoid the financial liability and potential for theft inherent within the conventional distribution of pre-activated PINs through retailers, some prepaid service providers have instead opted to rely upon point-of-sale activation of prepaid cards. When this approach is employed, the accounts associated with a set of prepaid cards (e.g., cards for prepaid telecommunications service) shipped to a retailer are not active and may not be used until authorization has been received from a central computing facility. Each shipped card may be imprinted with an account number or PIN identifying a specific account, or this information may be encoded within a magnetic stripe on the card.

As part of the process of distributing a prepaid card via point-of-sale activation, the retailer may swipe the prepaid card through a point-of-sale terminal so as to read the information encoded on the magnetic strip. Alternatively, this information may be read from the card by a clerk and keyed into the point-of-sale terminal. In either case the data is transmitted, either directly or indirectly, through the public switched telephone network to a central computing facility in the form of an activation request. The data within the activation request is compared to information for the account number or PIN previously stored within a central database of the computing facility. For example, information provided by the point of sale terminal may be compared to the previously stored information to determine if the location of the point of sale terminal matches the location identified by a control code encoded on the card's magnetic strip or otherwise imprinted upon the card. If the computing facility determines that activation request was issued from an authorized point-of-sale terminal, then the PIN or account number associated with the applicable card may be activated. At this point telecommunications or other services may be obtained by using the activated prepaid card in a conventional manner. In addition, the computing facility may return a code or message to the point of sale terminal confirming that the card has been activated and that the prepaid services are so capable of being obtained.

Unfortunately, it is currently not possible for retailers to electronically transact with a single entity for supply of multiple types of prepaid services offered by different prepaid service providers. Moreover, current prepaid service distribution systems have not adequately addressed the financial and security concerns of prepaid service providers while simultaneously affording them the convenience of dealing with only a single distribution entity.

SUMMARY

In summary, the present invention is directed to providing a transaction processing platform capable of facilitating the distribution to consumers of various types of prepaid products. Consistent with the invention, the transaction processing platform may be configured to interface with the systems of one or more providers of such prepaid products in order to facilitate the real-time procurement or activation of the products.

In a particular embodiment the transaction processing platform of the invention includes a conduit interface through which service request messages are received and respectively utilized to generate transaction requests for corresponding types of prepaid services. A supply interface arrangement, operatively coupled to the conduit interface, is configured to route a first of the transaction requests through a first supply interface associated with a first type of prepaid service. The supply interface arrangement also routes a second transaction request through a second supply interface associated with a second type of prepaid service. The platform is also configured to provide supplier response information received through the supply interfaces to the conduit interface.

In another aspect, the present invention pertains to a method for processing requests for prepaid services communicated to a transaction processing platform. The method includes receiving, through a first platform interface, a request for a personal identification number (PIN) generated by a first carrier entity. The method further includes receiving, through a second platform interface, a request for activation of a first prepaid card issued by a second carrier entity. A first transaction request is then routed, based upon the request for the PIN, to a first supply interface associated with the first carrier entity. The method also includes routing, based upon the request for activation, a second transaction request to a second supply interface associated with the second carrier entity.

The present invention also relates to a method for processing transactions involving prepaid services. The method includes receiving, at a first end-user interface device, an identification number associated with a prepaid card wherein the prepaid card is issued by a first carrier entity. The method further includes receiving, at a second end-user interface device, a request for a PIN generated by a second carrier entity. A first service request message is then generated, at the first end-user interface device, based upon the identification number. In addition, a second service request message is then generated, at the second end-user interface device, based upon the request for the PIN. The method further includes communicating the first service request message and the second service request message to a transaction processing platform. A first transaction request is then routed, based upon the first service request message, to a first supply interface. Similarly, a second transaction request is then routed, based upon the second service request message, to a second supply interface wherein the first supply interface is associated with the first carrier entity and the second supply interface is associated with the second carrier entity.

In yet another aspect the present invention is directed to a method for processing transactions involving prepaid services. The method includes generating, in response to a first service request message received through a conduit interface, a first transaction request for a first type of prepaid service provided by a first carrier entity. The method also includes generating, in response to a second service request message received through the conduit interface, a second transaction request for a second type of prepaid service provided by a second carrier entity. The first transaction request is then routed to a first supply interface associated with the first carrier entity and the second transaction request is routed to a second supply interface associated with the second carrier entity. The method also includes providing, based upon supplier activation information received through the first supply interface, a first service activation response to the conduit interface.

The present invention also relates to a method for processing transactions involving prepaid services. The method includes generating, in response to a first service request message received through a conduit interface, a first transaction request for a first type of prepaid service. The method also includes generating, in response to a second service request message received through the conduit interface, a second transaction request for a second type of prepaid service. The first transaction request is then routed to a first supply interface associated with the first type of prepaid service and the second transaction request is routed to a second supply interface associated with the second type of prepaid service. In addition, the method includes providing, based upon supplier activation information received through the first supply interface, a first service activation response to the conduit interface.

The present invention is further directed to a prepaid transaction processing method in which multiple units of one or more prepaid products may be provided pursuant to a single transaction. The method includes generating, in response to an order for prepaid services received through a conduit interface, a first transaction request for a first type of prepaid service. The method further includes generating, in response to the order, a second transaction request for a second type of prepaid service. The first transaction request is routed to a first supply interface associated with the first type of prepaid service. In addition, the second transaction request is routed to a second supply interface associated with the second type of prepaid service. The method further includes providing, based upon supplier activation information received through the first supply interface, a first service activation response to the conduit interface.

In another aspect the present invention is directed to a prepaid transaction processing method in which multiple prepaid product units may be provided pursuant to a single transaction. The method includes generating, in response to an order for prepaid services received through a conduit interface, a first transaction request for multiple units of a product relating to a first type of prepaid service. The first transaction request is routed to a first supply interface associated with the first type of prepaid service. The method also includes providing, to the conduit interface, product information received through the first supply interface in response to the first transaction request.

Additional aspects of the present invention are described below with respect to the appended drawings.

BRIEF DESCRIPTION OF THE DRAWINGS

For a better understanding of the nature of the features of the invention, reference should be made to the following detailed description taken in conjunction with the accompanying drawings, in which:

FIG. 5 depicts an exemplary set of simplified records included within a PIN/POSA database 134 in communication with the transaction processing platform.

FIGS. 8-11 illustratively represent a set of transaction routing tables utilized by the inventive transaction processing platform.

DETAILED DESCRIPTION

The present invention is directed to providing a transaction processing platform designed to facilitate the distribution to consumers of various types of prepaid products capable of being used to obtain goods and services such as, for example, telephone service, gasoline, electricity, dry-cleaning, bus service, subway service, magazines, newspapers, or bundled goods and services. Consistent with the invention, the transaction processing platform is configured to interface with the systems of one or more providers of such prepaid products in order to facilitate the real-time procurement or activation of the products. In exemplary embodiments of the invention these prepaid products may be of a number of different types including, for example, electronically-distributed PINs and prepaid cards requiring activation through point-of-sale application (POSA). In one embodiment, limited amounts of electronically-distributed PINs corresponding to various denominations of plural prepaid services offered by one or more service providers may also be maintained within a database co-located with the transaction processing platform. This permits the transaction processing platform to retrieve PINs from a local repository in certain cases, thus reducing latency by obviating the need to interface with a distal prepaid service provider.

After the customer purchases a pre-paid amount of a good or service, the customer either receives a personal identification number (PIN) or confirmation that a prepaid card purchased at a point-of-sale has been activated. In an exemplary embodiment the PIN or activation confirmation is generally provided by the transaction processing platform to the applicable point-of-sale over a network "on-demand", meaning that the PIN or POSA activation confirmation is typically downloaded over the network immediately or very soon after receiving a request and payment from the customer. After the customer receives the PIN or POSA activation confirmation, the customer can then use this PIN or the activated prepaid card to access the desired good or service.

Figure 1:
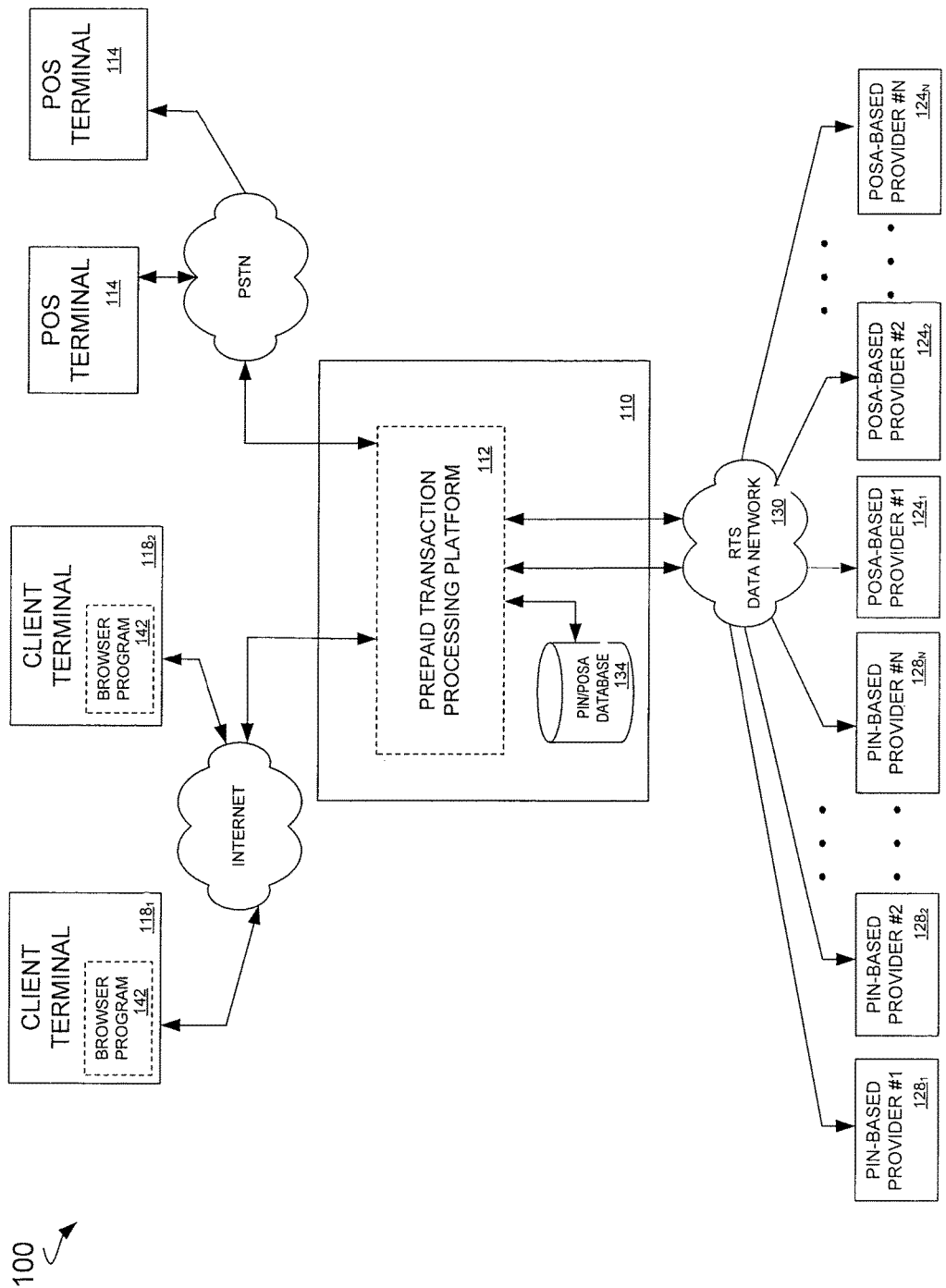
FIG. 1 is a block diagram representative of a system for electronically distributing prepaid products in accordance with the present invention.

Referring to FIG. 1, a block diagram is provided of a system 100 for electronically distributing prepaid products in accordance with the present invention. As shown, the system 100 includes a prepaid transaction processing facility 110 in communication with a plurality of end-user terminals via the public switched telephone network (PSTN) and the Internet. In particular, the PSTN communicatively links a transaction processing platform 112 within the processing facility 110 to a number of point-of-sale (POS) terminals 114. Similarly, plural client terminals 118 may also be communicatively coupled to the transaction processing platform 112 by way of the Internet. It is to be understood that the modes of communication between the transaction processing platform 112 and the terminals 114, 118 may be any of those known in the industry, and as such may alternately comprise private telephone networks or other networks, whether public or private.

The transaction processing platform 112 is also capable of communicating with a plurality of providers of prepaid services relying upon point-of-sale application for activation ("POSA-based providers) 124 and with a plurality of PIN-based prepaid service providers 128 through a real-time-supply (RTS) data network 130. Although it is of course possible that a given carrier (e.g., Cingular) may offer both POSA-based and PIN-based products, for clarity of explanation the POSA-based providers 124 are depicted as being distinct from the PIN-based providers 128. Those skilled in the art will appreciate that the principles of the present invention are not limited to the case represented by FIG. 1, and are equally applicable to embodiments in which one or more suppliers elect to offer multiple different types of prepaid services. It may also be appreciated that the POSA-based providers 124 and PIN-based providers 128 may, in certain embodiments, be representative of vendors to which the applicable carriers have outsourced their PIN supply and POSA activation responsibilities.

In response to a request for a PIN or activation of a prepaid card received from a terminal 114, 118, the transaction processing platform 112 may either obtain a PIN from a PIN-based prepaid service provider 128 or request the applicable POSA-based provider 124 to activate the specified prepaid card. Once an activation response or PIN has been received over the RTS data network 130 from a POSA-based or PIN-based provider 124, 128, the transaction processing platform 112 communicates the PIN or activation response to the requesting terminal 114, 118. In the case of a request for a PIN, the transaction processing platform 112 may alternatively retrieve the requested PIN, if available, from a local PIN database 134 within or proximate the processing facility 110 and send the retrieved PIN to the requesting terminal 114, 118. The supply of PINs within the local PIN database 134 may be replenished at regular intervals or when otherwise necessary through receipt of PINs from the PIN-based providers 128 (or other PIN suppliers) via the RTS data network 130. Alternatively, the local PIN database 134 may be replenished by the providers 128 (or other PIN suppliers) by manual downloading of PINs over another network (not shown) distinct from the RTS data network 130.

Each POS terminal 114 typically comprises a terminal device located at a retail facility that generally allows sales and credit card data to be exchanged between the retail facility and remote processing centers via the PSTN or other communication network. As is described hereinafter, each POS terminal 114 is also disposed to communicate with the transaction processing platform 112 in accordance with the present invention. Exemplary terminal devices capable of functioning as the POS terminals 114 are described in, for example, the above-referenced copending application Ser. No. 10/925,218.

When being utilized to request a PIN or point-of-sale activation of a prepaid card in accordance with the invention, a POS terminal 114 accesses the transaction processing platform 112 by calling a special number, typically a toll-free number. In this regard the POS terminal 114 may be programmed to call the special number when a prepaid phone card to be activated is "swiped" through the terminal 114, or may be simply be configured to call the special number in response to one or more keystrokes. Alternatively, when the POS terminal 114 is connected to a local area network or the like of the retail facility in which it is disposed, a computer or other device also connected to the local area network may instead be programmed to call the transaction processing platform 112.

As shown in FIG. 1, the transaction processing platform 112 may also be accessed via the Internet using the client terminals 118. Accordingly, each client terminal 118 executes a browser program 142 (e.g., Internet Explorer™) capable of permitting the terminal 118 to access the transaction processing platform 112 by entering an appropriate URL within the user interface of the browser program 142. In this way requests for PINs or for activation of prepaid cards may be entered into the browser program 142 and communicated to the transaction processing platform 112. For convenience of expression, the POS terminals 114 and client terminals 118 may be collectively referred to hereinafter as "client terminals".

Each PIN-based service provider 128 may be any service provider that provides telecommunication services, such as local telephone service, wireless telephone service, long distance, Internet service, or any other telecommunication or other services that may be provided in a prepaid manner through electronic distribution of a PIN. Similarly, each POSA-based service provider 124 may be any service provider capable of providing such services in a prepaid manner through remote activation of a prepaid card dispensed at a point-of-sale. Consistent with the invention, service providers 124, 128 cooperatively work with the transaction processing facility 110 to effect the distribution and activation of PIN-based and POSA-based prepaid products useable to obtain such services.

As is discussed in more detail below, once a PIN has been retrieved from the local PIN database 134 or otherwise obtained from a PIN-based provider 128, the PIN is sent by the transaction processing platform 112 to one of the terminals 114, 118 along with instructions for using the PIN. In the case of telecommunications services, these instructions will generally specify a toll-free access number which the customer is required to dial before placing a call and entering the PIN. Similarly, once a given POSA-based provider 128 has activated an account associated with a prepaid card purchased by a consumer at the location of a terminal 114, 118, an activation response received by the transaction processing platform 112 from such provider 128 is communicated to the applicable terminal 114, 118. This informs the customer that prepaid services associated with the account may be procured in the manner indicated by instructions printed upon the purchased prepaid card.

Figure 2:
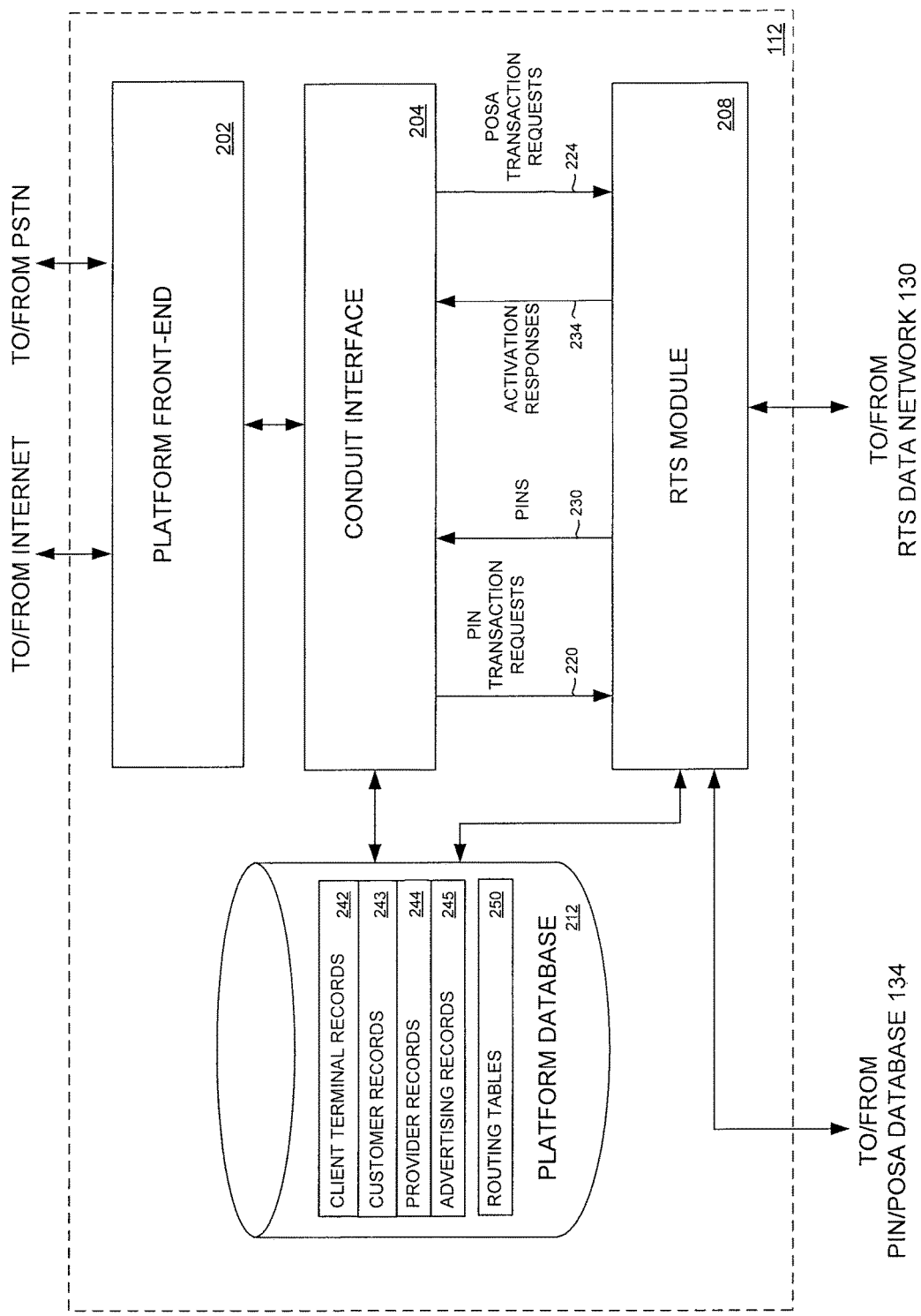
FIG. 2 provides an illustration of the principal functional components of a transaction processing platform configured in accordance with an embodiment of the present invention.

Turning now to FIG. 2, an illustration is provided of the principal functional components of the transaction processing platform 112. As shown, the transaction processing platform 112 includes a platform front-end 202, a conduit interface 204, a real-time supply (RTS) module 208, and a platform database 212. Each of the functional components of the transaction processing platform 112 may be realized using a combination of software and/or hardware for performing a task or set of tasks. For example, certain of the functional components may include at least a data processor, memory, and computer program code collectively enabling the component to carry out its prescribed tasks. In addition, ones of the functional components may also include input and output devices, short term and long term memory systems, communication devices, or multiple processors. In some implementations certain of the functional components may share common hardware and portions of a software library. It should be understood that the set of functional components of the platform 112 described herein is conceptual in nature, and there may exist a variety of combinations of hardware and software elements capable of executing the tasks of each component.

Platform database 212 includes client terminal records 242, customer records 243, provider records 244, advertising records 245 and routing tables 250. Client terminal records 242 store information concerning the locations of the terminals 114, 118. Client terminal records 242 can store any information specific to each of the terminals 114, 118, such as previous purchase history, payment and account information, and terminal preferences.

Customer records 243 provide information unique to individual customers. For example, customers can access the transaction processing platform 112 through a variety of different conduits, and may provide identifying information. The transaction processing platform 112 can use this information to provide better service to the customer, to target advertising to the customer, or to store payment or credit accounts.

Provider records 244 contain information pertinent to those providers 128 which provide PINs on a substantially real-time basis via the RTS data network 130 and/or which re-supply the local PIN database 134. For example, these records can contain addresses, billing information, and telephone numbers. The provider records 244 may also contain similar information regarding the POSA-based providers 124.

The advertising records 245 contain information about advertising banners and links that can be provided to client terminals 114, 118 as an additional source of revenue.

Routing tables 250 contain information which facilitates the routing of transactional information generated by the conduit interface 204 among various interfaces of the RTS module 208, and are described in further detail below.

As is described below, during operation of the platform 112 the conduit interface 204 receives, via platform front-end 202, service request messages for PINs and activation of prepaid cards from terminals 114, 118 and generates corresponding PIN transaction requests 220 and POSA transaction requests 224, respectively. In the exemplary embodiment the PIN transaction requests 220 and POSA transaction requests 224 are created, and routed to appropriate interfaces of the RTS module 208, by performing various database operations using the information within the routing tables 250. In response to a PIN transaction request 220 received at one of its interfaces, the RTS module 208 may obtain a PIN of the requested type from either the local PIN database 134 or one of the PIN-based prepaid service providers 128. Once the requested PIN has been obtained, the RTS module 208 provides the PIN and any ancillary information to the conduit interface 204 in the form of a PIN response message 230. The information within the PIN response message 230 is then communicated by the conduit interface 204 to the requesting terminal 114, 118 via the platform front-end 202, and the results recorded within the PIN/POSA database 134. Similarly, in response to a POSA transaction request 224, the RTS module 208 issues a request to the applicable POSA-based provider 124 to activate the specified prepaid card. Once an activation response has been received by the RTS module 208 from a POSA-based provider 124, the RTS module 208 provides activation response information 234 (e.g., activation successful or declined) to the conduit interface 204 and records the result within the PIN/POSA database 134. In turn, the conduit interface 204 communicates a corresponding activation response message to the requesting terminal 114, 118 via the platform-front-end.

In an exemplary embodiment the RTS module 208 determines which provider 124, 128 to contact and the appropriate manner in which to interact with such provider 124, 128 for procuring/activating a product item in real time. The RTS module 208 preferably provides a transparent mechanism capable of internally determining the way in which the product will be supplied/activated in real time and of controlling the actual interaction with the providers 124, 128. In the exemplary embodiment the RTS module 208 provides a separate interface for each product type supported by the transaction processing platform 112 (e.g., PIN, POSA). The conduit interface 204 utilizes the one of these interfaces corresponding to the type of product involved in the applicable transaction.

Figure 3:
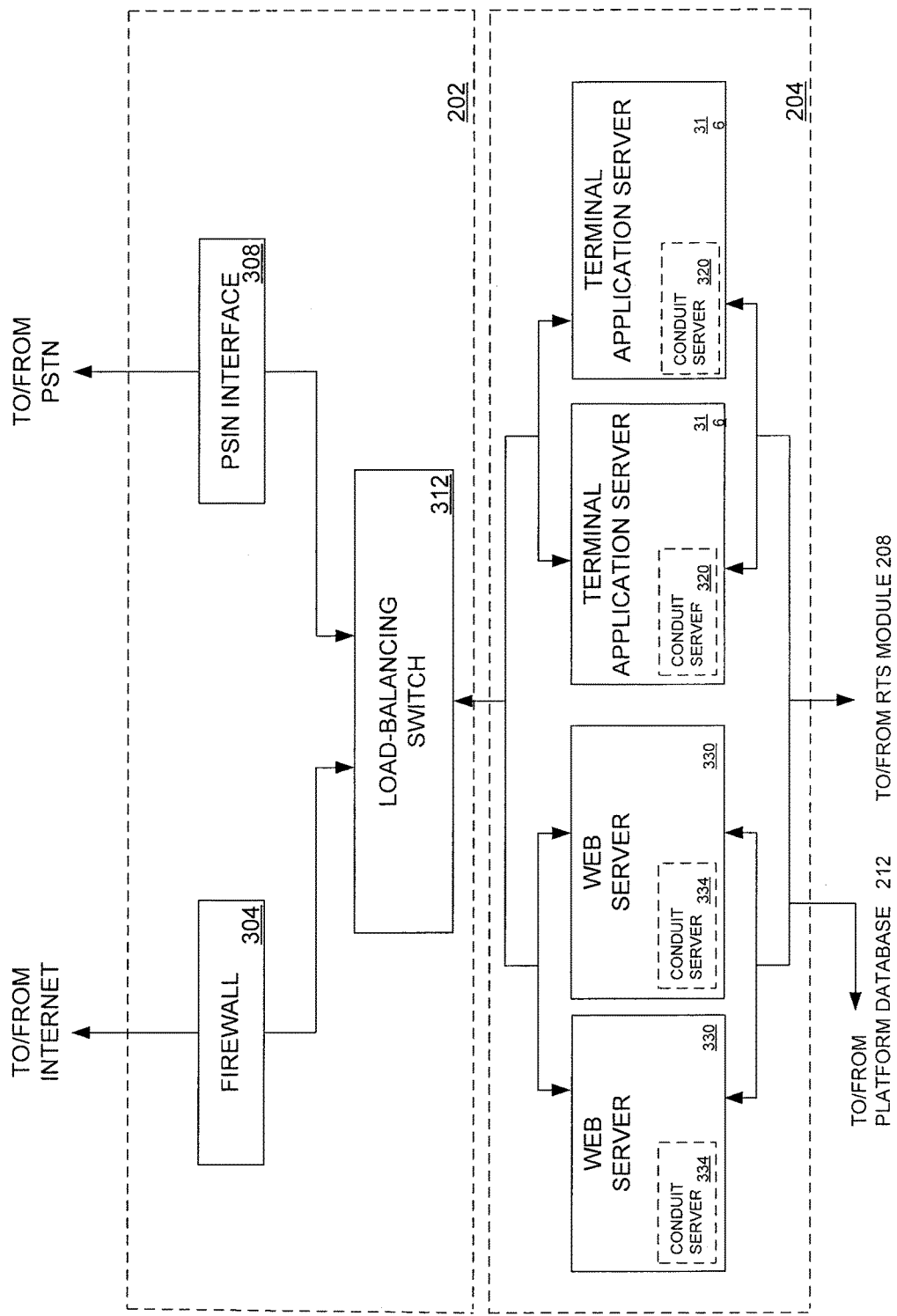
FIG. 3 provides a block diagrammatic representation of an exemplary implementation of a platform front-end and conduit interface included within the transaction processing platform.

Attention is now directed to FIG. 3, which provides a block diagrammatic representation of an exemplary implementation of the platform front-end 202 and the conduit interface 204. As shown, the platform front-end 202 communicatively couples the platform 112 to the Internet through a firewall 304 and to the PSTN through a PSTN interface 308. A load-balancing switch 312 apportions the PIN/POSA service request messages received from terminals 114 via the PSTN among terminal application servers 316. The load-balancing switch 312 also apportions the PIN/POSA service request messages received from terminals 118 via the Internet among web servers 330.

In the embodiment of FIG. 3 the conduit interface 204 comprises a pair of conduit servers 320 respectively executing upon the terminal application servers 316 and an additional pair of conduit servers 334 respectively executing upon the web servers 330. In other embodiments the conduit interface 204 may also include conduit servers responsive to PIN/POSA service request messages generated by client terminals other than the client terminals 118. For example, other embodiments may contemplate the use of client terminals operative for wireless communication incorporating browsers utilizing the wireless markup language (WML).

Figure 4:
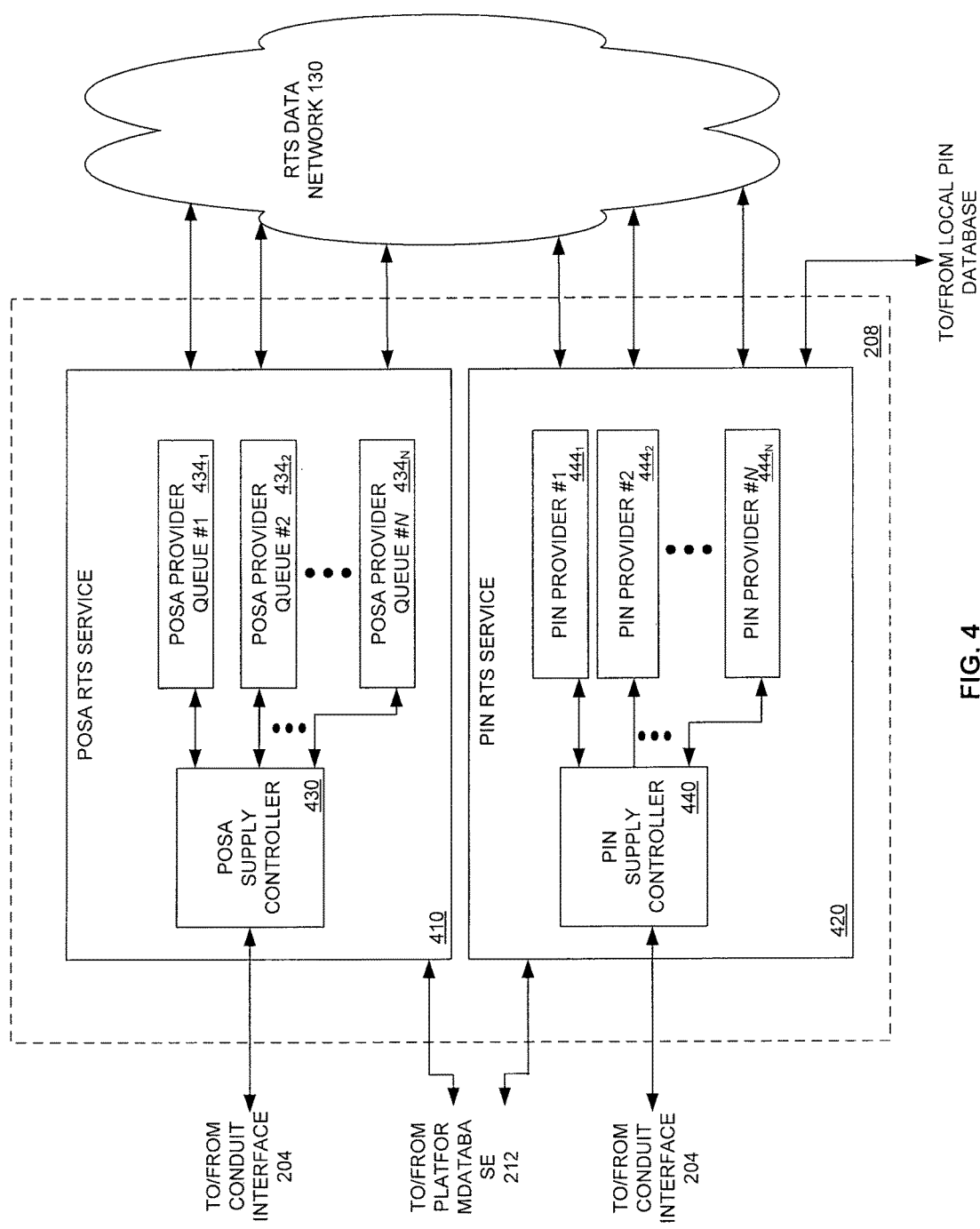
FIG. 4 provides a block diagrammatic representation of an exemplary implementation of a real-time supply (RTS) module included within the transaction processing platform.

Turning now to FIG. 4, an illustration is provided of an exemplary implementation of the RTS module 208 in block diagram form. As shown, the RTS module 208 is comprised of a POSA RTS service module 410 and a PIN RTS service module 420. The POSA RTS service module 410 may be represented as including a POSA supply controller 430 and a plurality of queues 434 for receiving POSA transaction requests destined for the various POSA-based providers 124. The queues 434 also hold POSA response information received from the providers 124. The PIN RTS service module 420 may be similarly represented as including a PIN supply controller 440 and a plurality of queues 444 for receiving PIN transaction requests destined for the various PIN-based providers 128. The queues 444 also hold POSA response information received from the providers 128. Of course, in alternate embodiments the RTS module 208 may include other service modules capable of handling transaction requests for other types of prepaid services (e.g., stored value, replenishment of an existing prepaid account, etc.).

Turning now to FIG. 5, there is depicted an exemplary set of simplified records included within PIN/POSA database 134. In one embodiment the PIN/POSA database 134 stores records 512 relating to PIN-based products, and records 522 relating to POSA-based products, potentially available for purchase by customers. Good/Service field 501 specifies the name of a good or service which is available for pre-paid purchase. For example, PIN-based records 512a-512j and POSA-based records 522a-522f shown in FIG. 5 relate to products providing access to pre-paid cellular service. Records 512k-l shown in FIG. 5 relate to PIN-based products which provide access to pre-paid gasoline. Other goods and services can be also be included in PIN/POSA database 134 such as electricity, cable service, satellite TV, etc.

Provider field 502 contains the name of the particular good or service provider associated with the record. For example, FIG. 5 shows records for CINGULAR, AIRTOUCH, SPRINT, and MOBIL. Value field 504 specifies the dollar value associated with each record. For example, record 512e provides a customer with $30 of pre-paid cellular service from CINGULAR. For PIN-based records 512, the PIN field 506 specifies the PIN which is provided to the customer and allows access to the good or service. For POSA-based records 522, the PIN field 506 may specify either a PIN, an account number, or some other indicia of the prepaid card to be activated. Rate field 508 specifies a rate associated for each record. For example, for cellular telephone service rate field 508 specifies the calling rate associated with the record. In the exemplary PIN/POSA database 134 shown in FIG. 5, rate field 508 is not used for gasoline records 512k and 512l, since the gasoline rate is determined at the pump.

Expiration field 510 contains an expiration date beyond which the PIN or the equivalent for that record will no longer be valid. PIN status field 516 may be provided to facilitate cost of goods computations for accounting purposes. For example, in one embodiment the PIN status field 516 for a record reflects the status of "AVAILABLE" until the product corresponding to the record is actually sold, at which point the status is changed to "SOLD". In other embodiments PIN-based records 512 may reflect a status of "SOLD" upon being loaded into the database 134, while the status of POSA-based records 522 may not be transitioned to a status of "SOLD" until activation of the product has actually occurred. A Usability status field 518 indicates whether the PIN or the equivalent associated with a given record 512, 522 is usable "as is" or whether activation of some sort is required to render it usable. In one embodiment a Usability status of "ACTIVE" reflects the former case (i.e., usable "as is") while a Usability status of "INACTIVE" reflects the latter case.

Other fields may also be added to the database 134 For example, fields relating to batch number, sale price, cost, purchase data, cart type and the like may be included within the database 134 in other embodiments. In addition, certain other fields may be particular to a specific good or service. For example, if gasoline is being sold then there may be a field for "Octane" which specifies the octane level of gasoline being purchased.

Figure 6A:
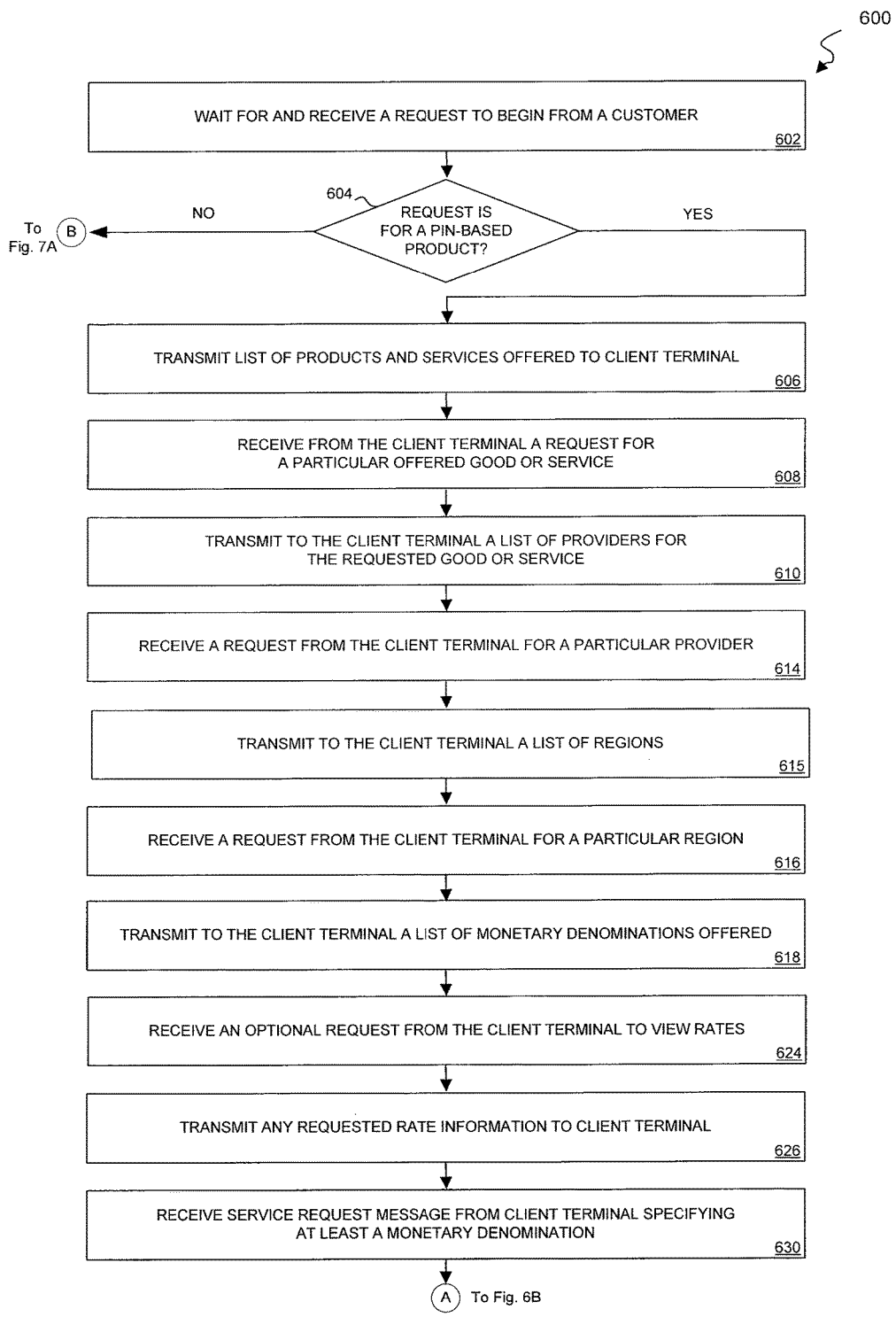
FIGS. 6A & 6B depict a flowchart illustrating a method of operating the transaction processing platform in accordance with the present invention.
Figure 6B:
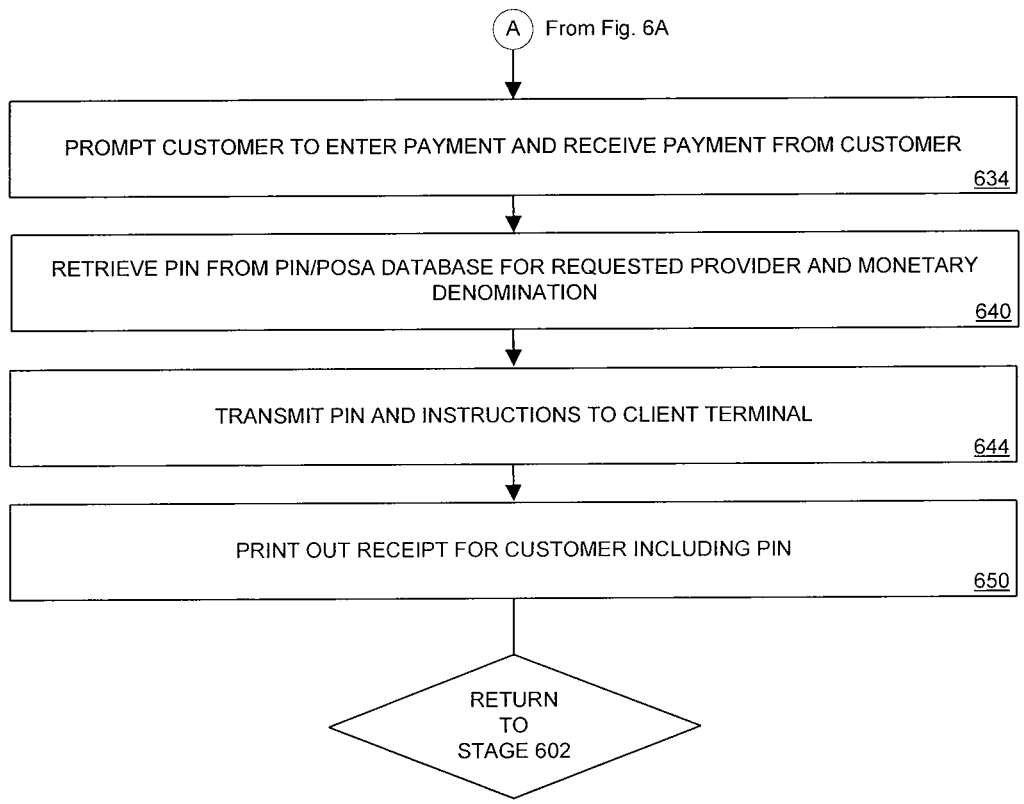

FIG. 6 depicts a flowchart 600 illustrating a method of operating the transaction processing platform 112 in accordance with the present invention. Initially, the transaction processing platform 112 receives a request from a customer to begin the process of purchasing a prepaid product (stage 602). Again, in the exemplary embodiment such prepaid products comprise at least PIN-based and POSA-based products capable of being used upon purchase to obtain specified goods and services. In a stage 604, the transaction processing platform 112 determines whether the request to begin pertains to a PIN-based product or a POSA-based product.

In response to receiving a request to begin the process of purchasing a PIN-based product, the transaction processing platform 112 transmits to the requesting terminal 114, 118 a list of products and services offered (stage 606). For example, transaction processing platform could transmit a listing of provider information relating to: 1) cellular telephone service, 2) long-distance telephone service, 3) electricity, 4) gasoline, and so on. The list of products and services transmitted to the requesting terminal 114, 118 could appear upon, for example, a touch-screen (not shown) of such terminal. The customer may then select a good or service of interest, at which point the terminal 114, 118 generates a request for the chosen good or service and transmits it for receipt by the transaction processing platform 112 (stage 608). In stage 610, the transaction processing platform 112 transmits to the terminal 114, 118 a list of providers for the requested good or service. For example, if the customer has requested cellular telephone service, transaction processing platform 112 may transmit a list of: CINGULAR, AIRTOUCH, and SPRINT. The customer then selects one of these offered providers through the user interface of the applicable terminal 114, 118, which results in a request being transmitted to the transaction processing platform 112 for a particular requested provider. For example, the customer could select "AIRTOUCH."

In stage 614, transaction processing platform 112 receives the customer's request for the particular provider requested. The transaction processing platform 112 then transmits to the terminal 114, 118 a list of regions for the requested good or service (stage 615). For example, if the customer requested "AIRTOUCH" in stage 614, then transaction processing platform 112 would transmit a list of regions such as "AIRTOUCH NORTHEASTERN U.S.," or "AIRTOUCH NEW YORK CITY METROPOLITAN REGION," OR "AIRTOUCH PACIFIC REGION," etc. In stage 616, transaction processing platform 112 receives the customer's request for a particular region.

In stage 618, transaction processing platform 112 transmits a list of pre-paid monetary denominations offered. For example, if a request for "AIRTOUCH" is received, the operator of the transaction processing platform 112 might offer pre-paid cellular service for AIRTOUCH in the following monetary denominations: $10, $20, $50, and $100.

Thus a customer could choose to buy a $50 "virtual" phone card which would provide him or her with $50 of pre-paid cellular service.

The conduit interface 204 of the transaction processing platform 112 can determine what monetary denominations are available by one of the following methods. As a first method, conduit interface 204 checks provider records 244 and looks up the record corresponding to the chosen provider (for example, AIRTOUCH). The conduit interface 204 then checks a field of the provider record to determine which monetary values may be requested from the chosen provider via the RTS module 208. In embodiments in which limited quantities of PINs for certain PIN-based products are obtained in advance from PIN-based providers 128 and locally stored within the PIN/POSA database 134, the conduit interface 204 may also check PIN/POSA database 134 in order to determine what types of monetary denominations have been locally stored.

As an alternative to transmitting a list of offered monetary denominations (stage 618), the customer could alternatively be allowed to simply type in at a keypad a desired amount of service that he or she desires. For example, a message would appear on touch-screen 204 stating "TYPE IN AN AMOUNT OF PRE-PAID SERVICE YOU WISH TO PURCHASE." The customer could then type in, for example, $50. Transaction processing platform 112 would then determine, based upon the contents of the provider records 244, whether the requested denomination was available from the specified PIN-based provider 128. Alternatively, it could be determined whether PIN database 112 contains any $50 PIN denominations from the requested provider either before or after ascertaining availability of the requested denomination from the applicable PIN-based provider 128. If there are no $50 PINs available from either source, transaction processing platform 112 could, for example, transmit a message stating "THERE ARE NO $50 PINS AVAILABLE. WOULD YOU LIKE TO PURCHASE A $40 PIN OR A $75 PIN?" Alternatively, transaction processing platform 112 could transmit a message stating "THERE ARE NO $50 PINS AVAILABLE FOR AIRTOUCH. HOWEVER, SPRINT AND MCI OFFER $50 PINS FOR CELLULAR TELEPHONE SERVICE. WOULD YOU LIKE TO PURCHASE FROM ONE OF THESE PROVIDERS?".

The customer can also be given an option to "View Rates." If the customer chooses this option, then a request to view rates is sent to the transaction processing platform 112. In stage 624, the request is received by transaction processing platform 112. In stage 626, transaction processing platform 112 transmits rate information to the requesting terminal 114, 118. For example, the rate information could specify that a $100 "virtual" pre-paid phone card purchased from AIRTOUCH has a cellular calling rate of $0.35 per minute, and the PIN expires in 6 months. It could also specify that a $50 virtual pre-paid phone card purchased from AIRTOUCH has a cellular calling rate of $0.40 per minute, and the PIN expires in 8 months.

In a stage 630, transaction processing platform 112 receives from the client terminal a service request message specifying the selected provider and one of the available monetary denominations. For example, the customer could select an option to purchase a $50 PIN from AIRTOUCH by touching the appropriate option on touch-screen 204. In stage 634, the transaction processing platform 112 prompts the customer at the client terminal to make payment for the requested PIN. Payment can be made by the customer to the dealer in a number of ways (e.g., cash, credit card, debit card, smart card or any similar method). Once the customer pays the dealer, then the dealer must transfer a portion of the payment to the operator of the transaction processing platform 112. Payment can be apportioned and transferred between the dealer and the operator by a number of methods. Some example methods:

First method "ACH WALLET": The dealer has a special account set up with the operator of the transaction processing facility 110. The dealer stores money in the account before the PIN is purchased. Immediately before a customer purchases one or more PINs, the dealer pays a portion of the payment to the operator of the transaction processing facility 110 by transferring money from the dealer's account to the operator's account by ACH (automated clearing house) electronic funds transfer. This method of payment is referred to as "ACH wallet."

Second method "CREDIT ACCOUNT": The dealer has a credit account with the operator of the transaction processing facility 110. The dealer is allowed a predetermined amount of credit based on the creditworthiness of the dealer. When a customer pays for one or more PINs, a portion of the payment is charged to the dealer's credit account. The dealer is then billed later for the amount charged.

Third method: The dealer simply provides credit card information to the operator of the transaction processing facility 110. When a customer purchases one or more PINs, a portion of the payment is charged to the dealer's credit card.

Fourth method: The customer's credit card information (or debit card, or smart card) is sent directly to the operator of the transaction processing facility 110. The operator of the transaction processing facility 110 then charges the customer's credit card and sends a portion of the payment back to the dealer.

As will be understood by one skilled in the art, the above methods are by example only and there are a multitude of ways that payment can be arranged between the dealer and the operator of the transaction processing facility 110. All of these methods do have one thing in common, however. The PIN is sent by the transaction processing facility 110 immediately after a payment is made (either by cash or credit). This eliminates costs associated with filled inventory; that is, because the PIN is sent right after payment is made, the dealer has no inventory carrying costs. Advantageously, the dealer does not have to predict which cards will be popular over the coming month, and how many cards of each type to order prior to the beginning of such month. Payment for the PIN is charged at the time of each transaction, and thus the dealer has no filled inventory costs.

In embodiments in which limited quantities of PINs are locally stored within the PIN/POSA database 134 and it is determined that a PIN corresponding to the requested denomination and provider exists within the database 134, then once payment has been received and verified (stage 634) the transaction processing platform 112 retrieves such a PIN from the database 134 (stage 640). Once this has occurred, the PIN status field 516 of the applicable record 512 may be marked as "SOLD" and unavailable so that the same PIN will not be sent to another customer.

Once the PIN status field 516 has been appropriately updated, the retrieved PIN and other information is transmitted by the transaction processing platform 112 to the requesting terminal 114, 118 (stage 644). The transaction processing platform 112 also transmits any instructions necessary to use the PIN. For example, the transaction processing platform 112 can transmit a telephone access number which the customer needs to dial before placing a cellular telephone call and entering the PIN. The telephone access number and other instructions will be unique for each provider. These instructions can either be stored in each individual record 512 in the database 134, or the instructions can be stored in provider records 244.

At stage 650, the client terminal 114, 118 prints out a receipt for the customer. The receipt includes the requested PIN(s) purchased by the customer, and any instructions for using the PIN such as a telephone access number. The receipt can also contain advertisements. Although the receipt will typically be printed upon paper, the receipt could alternately be in the form of a plastic card. The transaction processing platform 112 then returns back to stage 602, waiting for the next PIN or POSA transaction request.

Figure 7A:
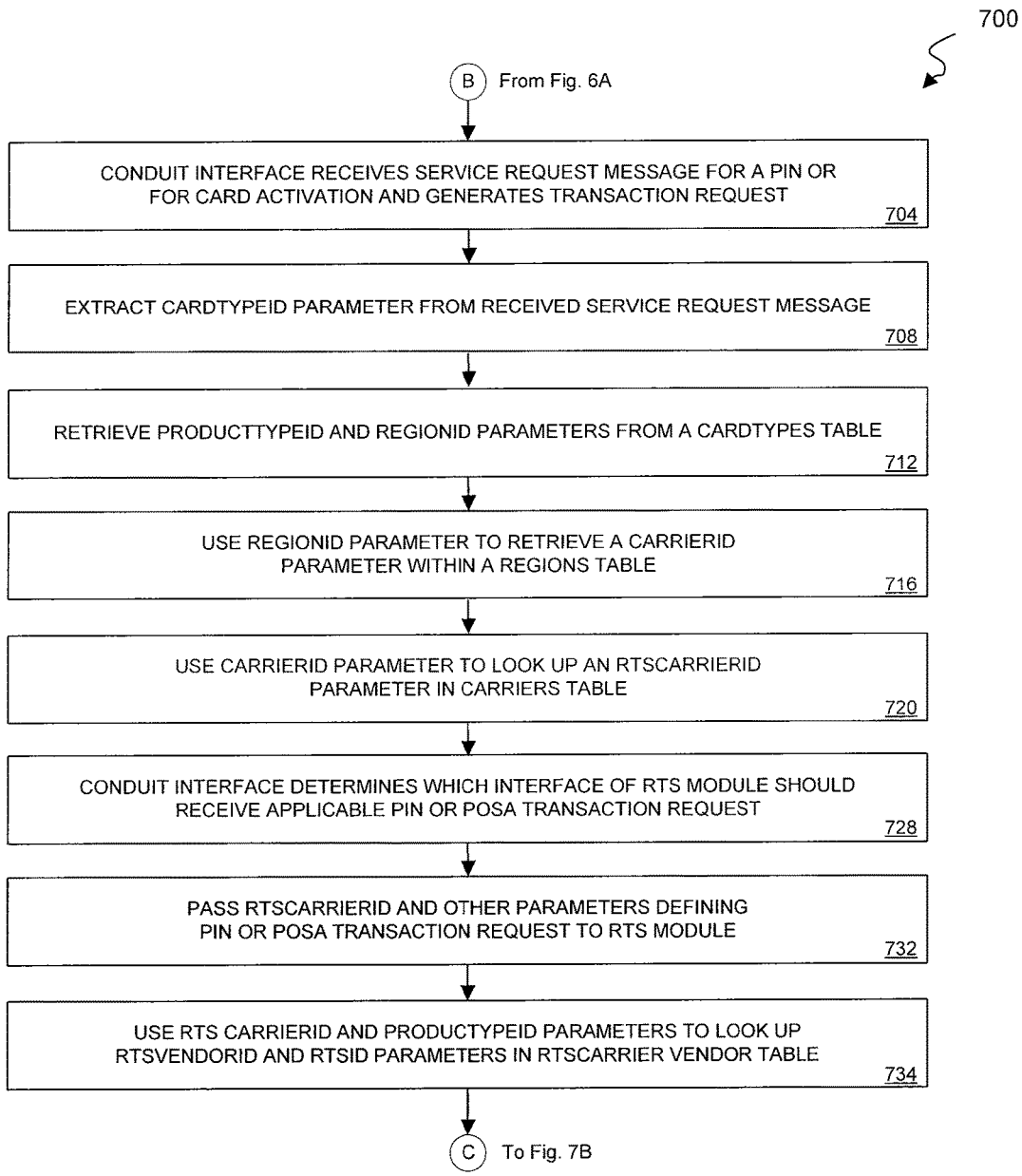
FIGS. 7A & 7B depict a flowchart representative of the data flow between the conduit interface and the RTS module in connection with obtaining PIN or POSA information from either a PIN based or POSA-based provider, respectively.
Figure 7B:
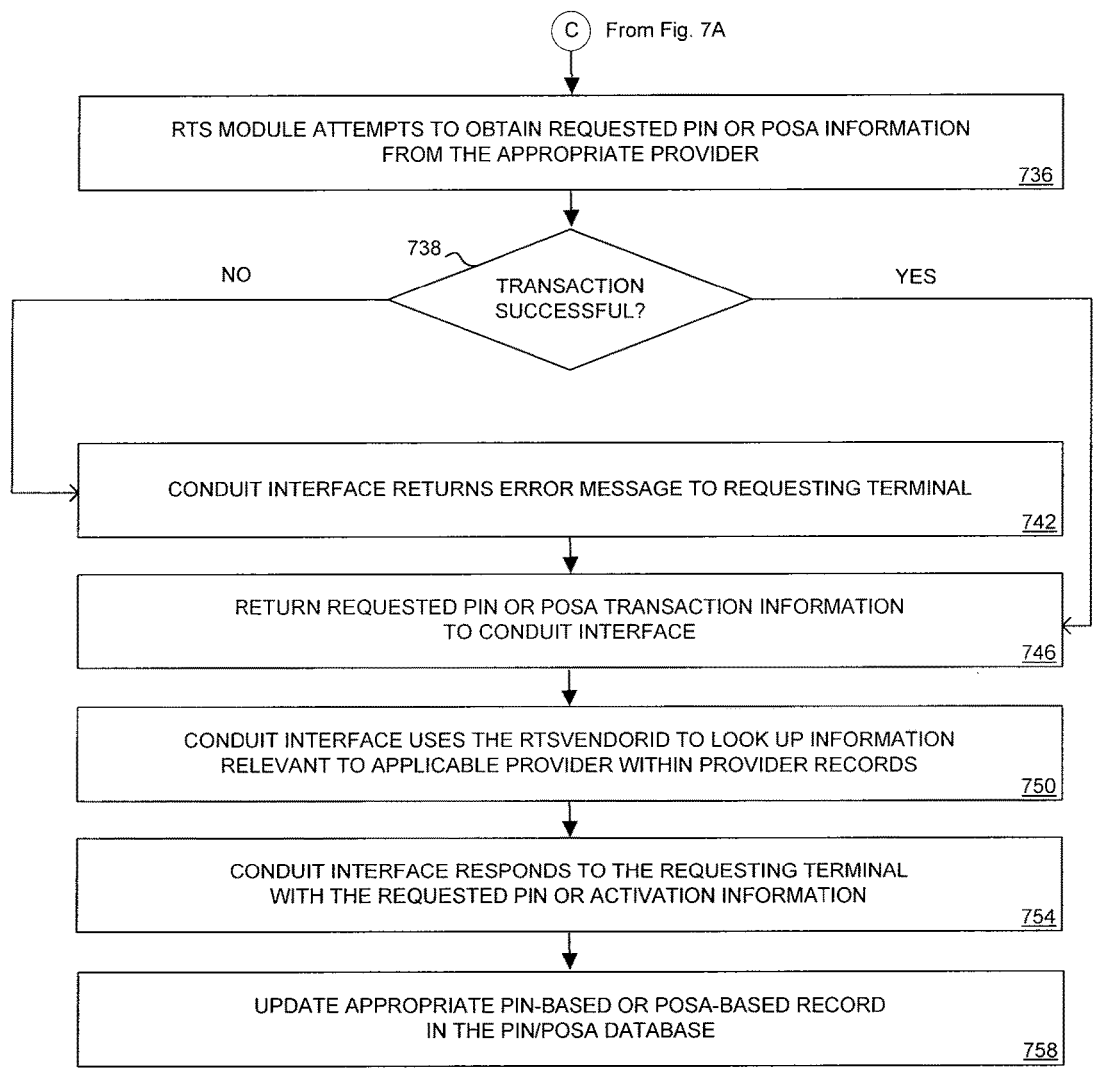
Figure 12:
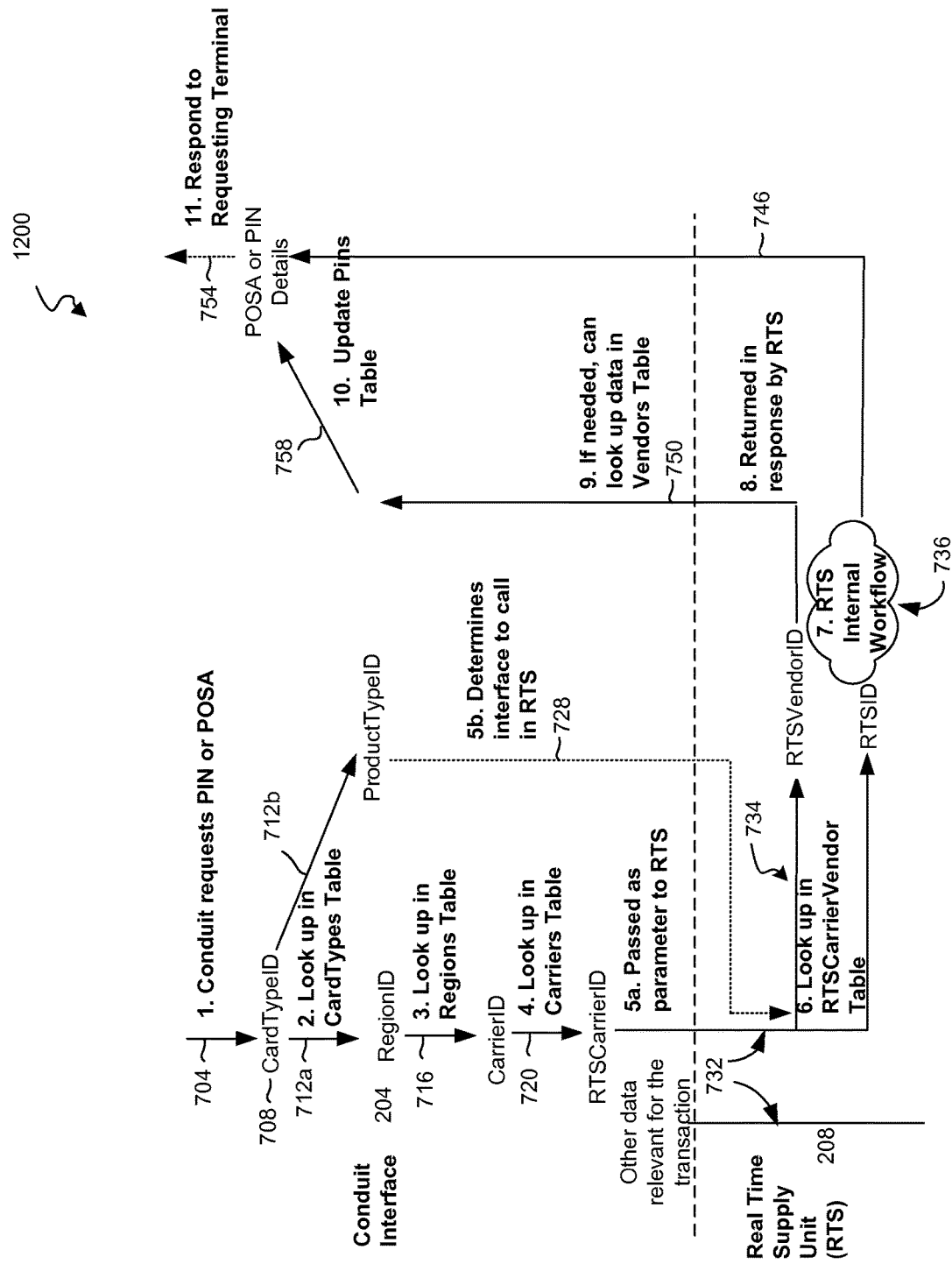
FIG. 12 is a process flow diagram representative of the data flow between the conduit interface and the RTS module in connection with obtaining PIN or POSA information from either a PIN based or POSA-based provider, respectively.

Turning now to FIGS. 7 and 12, there are respectively shown a flowchart 700 and process flow diagram 1200 representative of the data flow between the conduit interface 204 and the RTS module 208 in connection with obtaining PIN or POSA information from either a PIN based provider 128 or a POSA-based provider 124, respectively. As mentioned above, the conduit interface 204 receives a service request message for a PIN or activation of a prepaid card received from terminals 114, 118 via front-end 202, and respectively generates corresponding PIN and POSA transaction requests (stage 704). In the case of POSA transaction requests, the card which is the subject of the request may be uniquely identified by specifying the applicable carrier or vendor (DNIS), and the PIN or batch/sequence numbers from the card. This information may be printed upon the card or stored within the magnetic strip on its back.

In the exemplary embodiment the PIN and POSA transaction requests are created and routed to appropriate interfaces of the RTS module 208 by performing various database operations using the information within the routing tables 250. In a stage 708, the process of generating such a transaction request is initiated upon extraction by the conduit interface 204 of a CardTypeID parameter from the received service request message (stage 708). The conduit interface 204 uses the CardTypeID to look up a ProductTypeID and a RegionID parameters from within a Card Types table 800 (FIG. 8) included within the routing tables 250 (stage 712). Next, the conduit interface 204 uses the RegionID parameter to look up a CarrierID parameter within a Regions table 900 (FIG. 9) included within the routing tables 250 (stage 716). In a stage 720, the conduit interface 204 uses the CarrierID parameter to look up an RTSCarrierID parameter in a Carriers table 1000 (FIG. 10) of the routing tables 250.

The conduit interface 204 uses the ProductTypeID parameter to determine which interface of the RTS module 208 should receive the applicable PIN or POSA transaction request (stage 728). In the exemplary embodiment the conduit interface 204 calls a method in the RTS module 208 to request a PIN or POSA transaction, and passes it the RTSCarrierID parameter and other parameters defining the transaction request (stage 732). In the exemplary embodiment the following are included among these other parameters defining a POSA transaction request: RequestType, StoreNumber, TerminalID, CardBatchNumber, CardSequenceNumber, Amount, and DNIS. In this regard the request type is a string representing a valid POSA request type. The parameters StoreNumber and TerminalID are strings respectively identifying the store and terminal from which the request originated. In addition, the parameters CardBatchNumber and CardSequenceNumber are strings respectively representing the card batch, and the sequence number in the batch, for the PIN activation being purchased.

Finally, Amount is representative of the purchase amount, and DNIS is an input string represent of the dialed number identification service.

Figure 11:
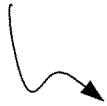

Next, the RTS module 208 uses the RTSCarrierID and ProductTypeID parameters to look up RTSVendorID and RTSID parameters in an RTSCarrierVendor table 1100 (FIG. 11) within the routing tables 250 (stage 734). The information inherent within the various parameters included within the transaction request enables the RTS module 208 to attempt to obtain the requested PIN or POSA information from the appropriate provider 124, 128 (stage 736). In the exemplary embodiment the communication over the RTS data network 130 between the RTS module 208 and the applicable provider 124, 128 is effected in accordance with conventional network protocols, such as TCP/IP. The RTS module 208 then determines whether the requested transaction was successful, and responds to the conduit interface 204 with an indication of success or failure of the transaction request (stage 738). If the transaction request is unsuccessful, the conduit interface returns an error message or code to the requesting terminal 114, 118 (stage 742).

If the RTS module 208 is successful in obtaining the requested PIN or POSA transaction information from the specified provider 124, 128, then this information is returned to the conduit interface 204 along with the RTSVendorID for the provider 124, 128 used in the transaction (stage 746). The POSA transaction information may include a POSA response code, an amount indicative of the requested amount, and a string representative of the vendor fulfilling the POSA request for the carrier indicated by the request. The conduit interface 204 may then use the RTSVendorID to look up information relative to the applicable provider 124, 128 from within the provider records 244 (stage 750). The conduit interface 204 then responds to the requesting terminal, via front-end 202, with the requested PIN or activation information (stage 754). As was previously described, in the case of a PIN transaction the requesting terminal then prints the PIN and any required ancillary information. Upon communicating this PIN or activation information to the requesting terminal 114, 118, the conduit interface 204 also updates the appropriate PIN-based record 512 or POSA-based record 522 within the database 134 (step 758).

Although the flowchart 700 and process flow diagram 1200 are directed to the case in which a request for a single product is received by the conduit interface 204, in alternate embodiments a single product order received by the conduit interface 204 may include a request for multiple units of a particular product or requests for one or more units of different products. For example, a terminal 114, 118 may generate an order comprised of a request for several PINs corresponding to a specified denomination (e.g., $50) of prepaid wireless service from a particular PIN-based provider 128 (e.g., Cingular), and additional POSA transaction requests directed to one or more different POSA-based providers 124. In these embodiments the conduit interface 204 is disposed to receive the order from the terminal 114, 118 and extract from it the multiple service request messages of which it is comprised. A PIN or POSA transaction request is then generated on the basis of each of these constituent service request messages. Each such transaction request is routed to an appropriate interface of the RTS module 208 and subsequently processed in the manner described above. If the RTS module 208 is successful in obtaining PIN/POSA transaction information corresponding to each of the transaction requests associated with a given order, then this information is aggregated by the conduit interface 204 and returned to the requesting terminal 114, 118. Otherwise, if one or more of the transaction requests is not successfully processed by the RTS module 208, the conduit interface returns an error message to the requesting terminal 114, 118. That is, in the exemplary embodiment orders for multiple products placed by the terminals 114, 118 are not "partially filled", and are only completed if all requested prepaid products are available.

In certain implementations an order comprised of requests for multiple units of one or more products may originate from a network node interposed between one or more of the terminals 114, 118. Such a node could, for example, function as a cache for various types of products frequently dispensed by the terminals 114, 118. Those skilled in the art will appreciate that such an arrangement may reduce the latency characterizing operation of those terminals 114, 118 served by the caching network node.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

What is claimed is:

1. A method for processing prepaid product transaction requests performed by a transaction processing platform having a processor and computer program code stored on a non-transitory computer readable memory which, when executed by the processor, causes the transaction processing platform to perform the method comprising ordered steps of:
   receiving a prepaid product transaction request message from a client terminal via a interface of the transaction processing platform, wherein the transaction request message includes a plurality of product activation requests for a prepaid product comprising a personal identification number;
   extracting the plurality of product activation requests from the transaction request message;
   determining the plurality of product activation requests were received from an authorized client terminal;
   determining an appropriate service provider for at least one of the plurality of product activation requests;
   routing the at least one of the plurality of product activation requests to the appropriate service provider;
   receiving in real-time, subsequent to routing the at least one of the plurality of product activation requests to the appropriate service provider, a response comprising the personal identification number; and
   returning at least one transaction response to the client terminal, wherein the at least one transaction response comprises an activation confirmation and the personal identification number.

2. The method of claim 1, wherein the transaction response includes response information that at least one of the plurality of product activation requests was successfully processed.

3. The method of claim 2, wherein the transaction response includes response information that at least one of the plurality of product activation requests was not successfully processed.

4. The method of claim 1, wherein the plurality of product activation requests comprise at least two identical requested products.

5. The method of claim 1, wherein the transaction request message includes information unique to a customer.

6. The method of claim 1, wherein the transaction request message includes advertising records.

7. The method of claim 1, wherein at least one of the plurality of product activation requests is generated in response to information in the transaction request message.

8. The method of claim 1, further including electronically distributing a prepaid product to the client terminal.

9. The method of claim 1, wherein the transaction request message is received via an Internet coupling.

10. The method of claim 1, wherein the client terminal is operative for wireless communication.

11. A method for processing prepaid product transaction requests performed by a transaction processing platform having a processor and computer program code stored on a non-transitory computer readable memory which, when executed by the processor, causes the transaction processing platform to perform the method comprising ordered steps of:
    receiving a prepaid product transaction message from a client terminal via a interface of the transaction processing platform, wherein the transaction request message includes a plurality of product activation requests for multiple units of a prepaid product comprising a personal identification number;
    extracting the plurality of product activation requests from the transaction request message;
    determining the plurality of product activation requests were received from an authorized client terminal;
    determining an appropriate service provider for at least one of the plurality of product activation requests;
    routing the at least one of the plurality of product activation requests to the appropriate service provider;
    receiving in real-time, subsequent to routing the at least one of the plurality of product activation requests to the appropriate service provider, a response comprising the personal identification number; and
    returning at least one transaction response to the client terminal, wherein the at least one transaction response comprises an activation confirmation and the personal identification number.

12. The method of claim 11, wherein the plurality of product activation requests comprise two requested products which share a denomination.

13. The method of claim 11, wherein the transaction request message includes information unique to a customer.

14. The method of claim 11, wherein the transaction request message includes advertising records.

15. The method of claim 11, wherein the client terminal is operative for wireless communication.

16. A method for processing transactions involving prepaid services performed by a transaction processing platform having a processor and computer program code stored on a non-transitory computer readable memory which, when executed by the processor, causes the transaction processing platform to perform the method comprising ordered steps of:

receiving from a client terminal operative for wireless communication, via a interface of the transaction processing platform, a first type of prepaid product activation request, wherein the first type of prepaid product activation request comprises a first type of prepaid product comprising a personal identification number;

determining the first type of prepaid product activation request was received from an authorized client terminal;

contacting, subsequent to receiving the first type of prepaid product activation request, a service provider of the first type of prepaid product activation request;

receiving in real-time, subsequent to contacting the service provider of the first type of prepaid product activation request, an activation confirmation and the personal identification number; and electronically distributing the first type of prepaid product to the client terminal.

17. The method of claim 16, wherein the client terminal and a provider of the first type of prepaid product interface through a platform database to enable real-time procurement and activation of the first type of prepaid product.

18. The method of claim 17 further comprising:

contacting a service provider of a second type of prepaid product; and electronically distributing the second type of prepaid product to the client terminal, wherein the client terminal and the service provider of the first type of prepaid product and the service provider of the second type of prepaid product interface through the transaction processing platform to enable real-time procurement and activation of the first type of prepaid product and the second type of prepaid product.

19. The method of claim 16 further comprising:

determining advertising to provide to a customer based on information in a customer record associated with the client terminal through a platform database, wherein advertising is provided to the customer through the client terminal.

20. The method of claim 16, further comprising:

receiving from the client terminal a second type of prepaid product activation request, wherein the second type of prepaid product activation request comprises a second type of prepaid product, wherein the second type of prepaid product activation request is generated in response to the first type of prepaid product activation request and electronically delivered to the client terminal.

* * * * *